(12) United States Patent
Theobold et al.

(10) Patent No.: US 7,348,747 B1
(45) Date of Patent: Mar. 25, 2008

(54) MOBILE ROBOT PLATFORM

(75) Inventors: Daniel Theobold, Sommerville, MA (US); Joshua Ornstein, Cambridge, MA (US); Jamie G Nichol, Cambridge, MA (US); Scott Eric Kullberg, Needham, MA (US)

(73) Assignee: Vecna, Cambridge, MA (US)

( * ) Notice: Subject to any disclaimer, the term of this patent is extended or adjusted under 35 U.S.C. 154(b) by 152 days.

(21) Appl. No.: 11/393,577

(22) Filed: Mar. 30, 2006

(51) Int. Cl.
*B25J 15/02* (2006.01)

(52) U.S. Cl. ............................ 318/568.21; 318/568.12; 318/568.11

(58) Field of Classification Search ............ 318/568.21, 318/568.12, 568.11, 567, 569; 901/1, 30, 901/8; 700/245
See application file for complete search history.

(56) References Cited

U.S. PATENT DOCUMENTS

| | | |
|---|---|---|
| 4,024,961 A | 5/1977 | Stolpe |
| 4,565,487 A | 1/1986 | Kroczynski |
| 4,709,773 A | 12/1987 | Clement |
| 4,932,831 A | 6/1990 | White |
| 5,022,812 A | 6/1991 | Coughlan et al. |
| 5,394,766 A | 3/1995 | Johnson |
| 5,443,354 A | 8/1995 | Stone |
| 6,144,180 A | 11/2000 | Chen |
| 6,263,989 B1 | 7/2001 | Won |
| 6,330,494 B1 | 12/2001 | Yamamoto |
| 6,408,225 B1 | 6/2002 | Ortmeier |
| 6,527,071 B1 | 3/2003 | Villedieu |
| 6,535,793 B2 | 3/2003 | Allard |
| 6,662,889 B2 | 12/2003 | De Fazio |
| 6,779,621 B2 | 8/2004 | Kamen |
| 2004/0076324 A1* | 4/2004 | Burl et al. .................. 382/153 |
| 2005/0234592 A1* | 10/2005 | McGee et al. .............. 700/245 |

OTHER PUBLICATIONS

Email Jamie Nichol pp. 2 of 2.
Marketing Collateral ATA Conf Apr. 2005/email Johnathan Klein.

* cited by examiner

*Primary Examiner*—Karen Masih
(74) *Attorney, Agent, or Firm*—Wright Law Group, PLLC; Mark F. Wright

(57) ABSTRACT

A mobile articulated robot platform is provided where the platform comprises a payload base hip section for attaching a torso, the platform having two opposing sides, where the platform includes a right leg assembly and a left leg assembly, with each leg assembly having an upper leg and a lower leg section, where the right and left leg assemblies each comprise a right upper leg being pivotally coupled on one side of said payload base hip section and a left upper leg being pivotally coupled to the other side of the payload base hip section, and a right lower leg being independently and pivotally connected to the right upper leg, and a left lower leg being independently and pivotally connected to the left upper leg, allowing rotation of each of the lower legs about each of the upper legs.

8 Claims, 36 Drawing Sheets

MOBILE ROBOT PLATFORM

BACKGROUND OF THE INVENTION

The present invention relates generally to the field of mobile robots and in particular to articulated robot platforms comprising payload mounting assemblies, leg mounting assemblies and joints for combining leg assemblies, mobility elements for leg mounting assemblies including wheels, tracks, wheels and tracks, and to payload torsos in general including payload torsos with arms for lifting and extraction.

The invention relates to robotic configurations which assume humanoid forms where there is a head, torso, hips, and legs. The present invention further relates to drive systems for driving tracks and wheels and to drive systems for rotationally moving leg assemblies at their joints. The present invention further relates to drive elements and control systems for establishing dynamic stability for such an articulated robot in various postures.

Robots are often used to perform tasks that are inherently dangerous for humans. For example, robots have been used to explore dangerous caverns, disarm explosive devices, and identify chemical biohazards. This often requires remote or teleoperated maneuvering. The invention therefore relates to mobile robotic platforms that carry appropriate sensor systems for inspection, search, detection, and like and similar tasks. The invention then also relates to both autonomous and teleoperated controls and to sensors and controls for establishing the state of the environment surrounding the mobile robot for use with autonomous and teleoperation of mobile robots. Various teleoperated systems which are known in the art support such robotic platform control. For example, the software architecture disclosed in Allard U.S. Pat. No. 6,535,793. Information on the Joint Architecture for Unmanned Ground Systems ("JAUS") can be found at http://wwwjauswg.org. This website features the definitive descriptions and publications for elements related to the JAUS standard.

Often, this application requires navigation over various terrains including terrains with rough and uneven surfaces. Therefore this invention relates to mobile robotic platforms comprising combinations of the above mobility elements including tracked mobility platforms, wheeled mobility platforms, and wheeled and tracked mobility platforms for navigating in such environments and to the combination of such mobility platforms with torsos enabled to lift heavy and non-rigid objects.

All-terrain, mobile robotic vehicles are known in and have been discussed extensively in the literature. Foster-Miller®, an engineering and technology development firm based in Waltham Mass. is developer of Talon™, an example of the current state of the art in a mobile tracked platform. Talon is capable of maneuvering over rough terrain, comprising a main platform with dual tracks. iRobot®, a robotic company based in Burlington, Mass., is developer of PackBot™. PackBot is a tracked mobility platform also capable of maneuvering over many kinds of rugged terrain, which comprises a main frame in combination with forward arms and can self-right itself if flipped over. In addition, PackBot as disclosed in the work of WON, U.S. Pat. No. 6,431,296, is also capable of navigating up stairs. U.S. Pat. No. 6,662,889 off De Fazio has similar structure but utilizes a wheeled platform. Therefore, the invention relates to tracked platforms with symmetrical configurations having main stages with parallel tracks and to platforms with untracked and/or tracked forward stages in combination with tracked main stages where the forward stage provides additional flexibility in self-righting and in stair traversal.

Robots are further used to lift and move objects which would be prohibitive or difficult to handle. This invention therefore relates to mobile robotic platforms which combine mobile platforms with lifting torso configurations capable of maneuvering, lifting, and conveying difficult to handle objects and in particular to robots capable of maneuvering when engaged in conveying such difficult to handle objects in tight spaces.

In addition, robots have been used for transporting heavy loads from one location to another including traversing various obstacles such as navigating stairs. For example in the work of CHEN U.S. Pat. No. 6,144,180 a mobile robot is provided for that can carry a heavy load from one location to another including up or down a flight of stairs using a dual wheel and tracked mobility platform.

Robots used for handling heavy loads have been configured with torsos and arms for cinematic enjoyment by the consumer. Robots with torsos, arms, and end effectors are deployed commercially in mobile postures where their operation on assembly lines provides for the manipulation of objects with difficult to handle shapes that also are characterized by having substantial weight, such as in the assembly line for automobiles, a field of practice in which robots with bases, having arms with end effectors and motion controllers enabling multiple degrees of freedom are deployed for various application specific tasks. The work of JOHNSON U.S. Pat. No. 5,394,766 provides for a robotic human torso deployed by Disney and the work of KROCZYNSKI U.S. Pat. No. 4,565,487 provided for a robot with legs or arms. Many others have provided controlled and balanced articulated platforms for industrial use. U.S. Pat. No. 4,024,961 (Stolpe) and U.S. Pat. No. 6,408,225 (Ortmeier et al.) are representative. Therefore the invention relates to robots with articulated torsos for the purpose of lifting and conveying difficult to handle objects and the invention relates to robotic torsos and robotic arms capable of lifting payloads of various weights.

The invention also relates to Dynamic Balancing Behavior ("DBB") as a behavior that can be employed to enable mobile platforms carrying a payload to maneuver and navigate while maintaining a consistent and stable position of the center of gravity (dynamically stable) of their mobile platform while in motion. U.S. Pat. No. 6,527,071 (Villedieu) provides for a gyroscope stabilization mechanism in a two wheeled robot and, U.S. Pat. No. 6,330,494 (Yamamoto) provides a stabilizing system in which a playback technique is used to redeploy a posture in a feedback control loop. In Raibert, M. H., *Legged Robots that Balance*, MIT Press, Cambridge, Mass., 1986, an earlier use of this mechanism is disclosed.

Segway Inc. of Bedford N.H. has developed and marketed the Segway Human Transporter which utilizes dynamic stabilization to keep a human payload in an upright position while moving forward over regular terrain. KAMEN in U.S. Pat. No. 6,302,230 (Kamen et al.) and U.S. Pat. No. 6,779,621 disclose Dynamic Balancing Behavior ("DBB") as a basis for stabilization of a personal mobility transporter. Therefore the invention relates to mobile platforms which employ dynamic balancing behavior to achieve stabilization in operation for achieving various maneuvering goals.

The known prior art presented provide publicly known solutions that advanced or now serve to advance the state of the art in mobile robotic platforms, but each known solution has readily observed problems or limitations. For example, U.S. Pat. No. 6,263,989 of Won shows a FIG. 8C (side view of FIG. 3a) as depicted here in FIG. 22 where MP is main platform and FP is forward platform.

FIG. 3a b and c show the robot 100 in a fully extended position. The main section incorporates a dual track configuration in which the side plates 312 are rigidly coupled by the tubes and articulator shaft. This portion of the construction results in "high pointing" (also known as "high topping" or "high centering") in which a portion of the assembly can get stuck on an object whose height is taller relative to ground than the plane of the tubes and articulator shafts.

In U.S. Pat. No. 6,662,889 De Fazio, for example, FIG. 1b, FIG. 2, FIG. 1b discloses a wheeled embodiment of a robotic platform in which a front assembly is coupled to a main section. This platform is, in effect, a derivative of WON and suffers from the same limitations of WON. Although the device is comprised of an entirely wheeled mobility system, no other advantage is afforded the structure other than faster operation on normal terrain.

So, both these robots suffer from a common drawback. First, they are limited to being configured with solely tracks or solely wheels, thereby limiting the number of end uses the platform may serve. Further, both robots are designed for typical operation with a regular payload, but only when they are not burdened with a significant payload or one which is non-rigid. For these robots, having to carry such other forms of payloads can significantly complicate and fundamentally compromise their maneuverability and overall effectiveness.

In U.S. Pat. No. 614,418, Chen, for example in FIG. 3 presents a hybrid wheeled and tracked robotic platform in which the platform is designed for stair climbing while holding a payload of substantial and material substance. What is described is a vehicle that has a pair of lift arms and a pair of leg support arms. The ability to raise the tracked structure separately from the wheel permits a form of stair climbing in which the rotational posture of each of the track and wheel respectively "walk" along a surface or up a set of stairs, with each assembly respectively, rotationally taking a lead position, and by lifting the other set, ambulating in one direction or another, as shown in FIG. 6. FIG. 9 shows how the tracks can be stowed and wheeled motion can permit the navigation of an incline while keeping the payload balanced in an upright position. Each wheel and track subsystem is an integral device which permit the mobility that Chen delivers. In particular, a track is pivotally hinged with a single wheel on a transverse axis such that the track can be stowed up to permit the wheel to locomote, or placed down for balancing on a plane or stair.

What is provided for therefore, in Chen, is a vehicle that has a pair of lift arms and a pair of leg support arms. The ability to raise the tracked structure separately from the wheel permits a form of stair climbing in which the rotational posture of each of the track and wheel respectively "walk" along a surface or up a set of stairs, with each assembly respectively, rotationally taking a lead position, and by lifting the other set, ambulating in one direction or another, as shown in FIG. 6. FIG. 9 shows how the tracks can be stowed and wheeled motion can permit the navigation of an incline while keeping the payload balanced in an upright position. Each wheel and track subsystem is an integral device which permit the mobility that Chen delivers. In particular, a track is pivotally hinged with a single wheel on a transverse axis such that the track can be stowed up to permit the wheel to locomote, or placed down for balancing on a plane or stair. It is a limitation of Chen that the relationship of the wheel set and track set in a particular leg are at a fixed angular position, one with respect to the other, and rotate in unison when deployed for the Chen maneuvers. It is further noted that a limitation of Chen is that the payload must be placed on the mobile platform and conveyance is then elected as the next maneuver. Chen therefore has the limitation of not being able to both lift and convey a payload. The interlocked wheel and track mechanism of Chen has the further limitation of being limited to operating on a set of wheels or a horizontally deployed track which offers increased friction for applications in which more efficient or faster movement is desired.

With respect to platforms designed to operate in dynamically stable postures, the current art shows solutions where the underlying technology used by the Segway® has only been applied to transporters designed for easily navigable terrain in which the user starts from an upright posture, near dynamic balance with the purpose of maintaining such dynamic stability in forward motion at various speeds. Further, Segway®-like systems are designed for limited-purpose, human use, and are thus equipped with safety features that diminish the marvels of the underlying DBB technology. Among other limitations of present DBB platforms such as Segway® transporters are their need to maintain a strict vertical balance to avoid throwing their riders, and their need to restrict the maximum speeds for saftey and by law.

Although the above described devices represent advances over previous designs for mobile robot apparatus, the above referenced inventions have notable limitations. They are inefficient, poorly suited, and/or limited in their mobility when engaged in lifting and extraction and further are ineffective in operating in heterogeneous terrain that encompasses smoother more generally tractable expanses and expanses that comprise rough, uneven and unpredictable terrain, while still supporting the goal of lifting and extracting cumbersome and heavy objects.

Then, what is provided for in the present invention discloses a mobile apparatus that is unique and comprises a number of new aspects each of which individually operates to unexpectedly overcome the specific limitations mentioned above and which new aspects, when taken in various combinations, serve to not only overcome the limitations mentioned but further the "state of the application art" in mobile robot platforms with additional novel architectures for mobility as well as offering additional unexpected benefits in heretofore unaddressed end uses.

What is new in this invention is the deployment of a payload base as a hip assembly for allowing the attachment of a torso, in particular a torso for lifting heavy payloads, and for permitting the configuration of separate and parallel leg assemblies, each of which may be independently articulated, which leg assemblies each comprise independent upper and lower leg sections, which upper and lower leg sections, when respectively outfitted with mobility elements, themselves can each be independently driven to permit novel mobile operation. What is new in this invention is the provision of such a set of leg assemblies, where the mobility elements permit both a homogeneous configuration of an all tracked platform or an all wheeled platform, as well as hybrid configurations in which tracks are provided on upper leg sections and wheels on lower leg sections, or just tracks or wheels on lower leg sections, each of which configurations offers certain application specific advantages, the present advantage of which is unique to this invention, where the new feature offers the additional advantage of hybrid outfitting of a common dual legged platform. What is new in this invention is the addition of independent dynamic balancing control to each of the leg sections permitting maneuvers where dynamic stability is achieved and in particular to the ability to move from a statically balanced posture to a dynamically balanced posture with directional movement. The ability to offer this feature in a mobile platform of the form provided for in this invention is new and further, the ability to use dynamic balancing to move from a statically balanced position to a dynamically balanced position in conveyance maneuvers where the lifting and transfer of a payload is required is new. It is also new to provide the feature of dynamic balancing in a mobile platform as provided for in this invention as a preferred configuration for climbing stairs, navigating over rough terrain, and lifting a payload and maneuvering on stairs or over various other forms of terrain where the new feature is the way in which the leg sections can be articulated, powered, and balanced to achieve said application specific ends.

The opportunity to solve problems which prior tools in this space have as their limitations enables us to provide for an invention that relates to new ways to make a mobility platform that provides new and useful aspects which serve to overcome the limitations of the prior, publicly known solutions.

Therefore, the limitations of Won and DeFazio are overcome in the present invention by providing for the independently articulated upper leg assembly where the upper leg sections are pivotally connected to the payload base hip section, resulting in avoidance of high pointing caused by the rigid frame coupling the tracks together, where the rigid frame can impact with an object. Taken in combination with the rotational features of the knee joint which couple the upper leg and the lower leg, the present invention offers the unexpected advantage of avoiding high pointing. Further, in FIG. 8a-c Won depicts what is called "upright mobility mode" in which the mobile platform of Won can drive on the front track portion and move forward in "praire dog mode" where the robot balances the main body on the forward arms. It is noted that this is also the position where the center of gravity is in a position defined by the arco of the arms but "just short of a position in which the robot would topple". Not only does this configuration have the limitation that no load bearing weight can be deployed or conveyed, if Won were in drive motion and hit any object, this impact alone would result in a toppling outcome and the robot would need to re-right itself in order to proceed in what is referred to as the upward mobility mode. WON has no mechanism to maintain balance when mobile if an obstacle is hit on uneven terrain. The apparatus of the present invention can operate in an upright mobility mode with the upper legs raised, and not only avoid obstacles that WON would be unable to avoid simply by the independent articulation of its legs in repositioning it's hip assembly to a higher plane. In addition, the apparatus of the present invention provides for increased stability in such an upright mode by maintaining dynamic stability using the dynamic balancing control system to establish a variety of mobility modes in both a fully loaded as well as an unloaded configuration, while maintaining upward stature when in motion over various terrains. In each of these dynamically stable postures, the apparatus of the present invention is able to establish the vertical projection of the center of gravity on the ground in a position within the footprint established by the contact point of the apparatus with the ground, thereby maintaining posture while moving over the ground.

The present invention provides for an improvement over De Fazio, where a fully wheeled platform is provided, by offering the independently articulated leg structure set forth above while further providing a structure in which each of the wheel sets may be driven separately and where the wheel sets, when driven, provide for mobility, as well as offering the option of movement in dynamic balance. Further, the present invention offers the option of fitting the upper leg section with a track, permitting a tracked method of achieving mobility by coupling the drive wheels with a track that is engaged in each of the wheels. This improvement enables a single robotic platform to be outfitted with either construction permitting a much larger application domain for deployment, for example, the ability to operate over rough and uneven terrain using the tracked section, and alternatively operating over smoother terrain more efficiently by using the wheeled sections.

The present invention overcomes the limitations inherent in Chen. With respect to Chen, a preferred embodiment of the present invention deploys an upper leg independently from a lower leg and therefore deploys, in at least one embodiment, a set of wheels independently from a set of tracks. Further, the present invention establishes its balancing control on either the footprint established by the tangent of the wheel or the tangent of the track or the tangent of the wheel and track, for drive movement forward, in reverse, or in a circle while using the full longitudinal articulation for increased speed and for more flexible mobility on a stair or over substantially similar obstacles. The present invention permits both structural support for lifting and provides for maneuvering in far more flexible ways and in a smaller locus, while operating at higher speeds in two wheel dynamic stability mode. The present invention overcomes the limitation in Chen in which the wheel and track are interlocked, by providing for upper and lower legs that can be articulated completely independently one from the other, as well as being controlled and driven independently, not only for providing for improved maneuverability, but also permitting operation on solely the tangent of either a set of wheels with the ground or on a tangent of a set of tracks with the ground, by integrating dynamic stability in the application of balancing, with or without a load, to permit the present invention faster and more efficient drive speeds as well as far more flexible operation with a payload including lifting, extraction, and deposition.

Further, what is new in this invention, which permits the present invention to overcome the limitations of Kamen and the way in which dynamic balancing is achieved in Segway and other like and similar conveyance devices, is that the present invention provides for dynamic stability control in combination with the joint articulation of the present dual independent leg mobility system, to enable the platform to move from a static to a dynamically balanced position, to do so while lifting a payload, and to maintain dynamic stability while in conveyance mode.

What is new with respect to stereotypical robot configurations that are provided for here is an invention in which a separately controlled and articulated upper/lower leg system is connected through rotational joints to a payload base hip section, providing for a novel structure for a mobility platform which eliminates the highpoint interference of a main platform section in the majority of maneuvers.

In particular, the invention delivers new ways to configure a mobility platform and ways to stabilize such a platform under no load and load conditions. This invention presents such a separately controlled and articulated upper/lower leg platform which further employs dynamic stabilization to permit additional forms of high speed maneuverability over a diverse set of terrains. Further, this invention provides for the above mentioned platform in combination with a torso capable of its own respective degree of freedom and which further enables lifting, maneuverability, and conveyance of a payload while preserving all of the flexibility enabled when unloaded. This invention further provides a hybrid wheeled and tracked robotic platform in which the platform is capable of maintaining a center of gravity in dynamic balance with the minimum point of ground contact established between the platform and ground, which also permits a second stair climbing maneuver while holding a payload of substantial and material substance. The invention further provides for motor hubs in which the drive system for the hub is contained within the within the hub and for wheeled configurations in which the hubs may be individually configured with tires or paired and coupled with tracks to permit a single mobile platform which can be deployed as solely wheeled, upper leg dual tracked and lower leg wheeled, or upper and lower leg dual tracked.

The present invention deploys a set of wheels independently from a set of tracks and establishes its balancing control on either the footprint established by the tangent of the wheel or the tangent of the track or the tangent of the wheel and track, for drive movement forward, in reverse, or in a circle while using the full longitudinal articulation for mobility on a stair or over substantially similar obstacles, permitting both structural support for lifting and maneuvering in far more flexible manner and in a smaller locus, all while operating at higher speeds.

So, the present invention is novel with respect to the structural configuration that uses tracked mobility elements and wheels as mobility elements in the basic manner in which such wheel and tracks are deployed as independently articulated members, and further, when combined with dynamic stability controls that permit the displacement of the center of gravity over a minimal footprint established by the contact of a portion of the mobility element with the ground, providing the ability of the mobile platform to move in yet additional maneuvers including rapid movement over a variety of terrains.

SUMMARY OF THE INVENTION

Consequently, there exists a clear need for mobile apparatus that are better suited to higher agility on rugged terrain while engaged in a sequence of actions that involves at least lifting of cumbersome and heavy objects while achieving high mobility and high agility on rugged and otherwise steep or uneven terrain. The preferred embodiment of such improved platforms would have increased robustness and battery life, compact yet highly flexible articulation, and be scalable according to the components and drive mechanisms elected for any given target application requirements, while delivering enhanced ability to traverse challenging terrain under load bearing weights.

The invention therefore relates to upper and lower leg sections pivotally combined with a payload base hip section where the upper and lower leg sections are each independent from one another and where each is further comprised of one or more mobile elements which are connected with a drive system for driving each of the mobile elements independently of the other, and for rotating each of the leg sections independently, one around the other and the upper section around the hip section. The invention further relates to mobile platforms comprising the elements above in combination with a dynamic balancing control system for allowing the apparatus to reach dynamic balance in various motive states including motive states in which a torso is combined with the apparatus, and further where the torso is wielding a payload.

This invention therefore provides for a new and useful combination of features including an independent, separately controlled and articulated set of legs comprised by pivotally connected upper and lower leg assembly, each pivotally connected at a payload base hip, with a hip configured to support the attachment of a torso assembly for lifting and shifting a payload for purpose of conveyance, where the apparatus is further controlled by a set of mobility elements that implement a homogeneous wheel or track apparatus or a hybrid combination of wheel and track, where the wheels and tracks may be driven independently from one another, and further provides for the selective control of each of the drive mechanisms under dynamic balance control to provide for movement from a non dynamically balanced position to a dynamically balanced position under both no load and electively loaded conditions.

What is new in this invention is the novel reconfiguration of such known forms of humanoid construction, using unique variations of such humanoid members, with the objective of providing a set of previously unavailable mobility structures. In addition, what is new in this invention is using such previously unknown combinations of novel structures taken together with drive means to permit previously unavailable mobility and associated locomotions, and further what is new in this invention is taking said previously unknown combinations of novel structures with their drive means, in further combination with specialized control features to permit yet additional and previously unavailable dynamic mobilities and associated dynamic locomotions.

In particular, what is new in this invention is a mobile platform that provides for an upper leg assembly formed from separate and independent upper leg sections where each leg section has a respective set of mobile elements, including wheels and tracks for providing propulsion, in combination with a lower leg assembly formed from separate and independent lower leg sections where each leg section has a respective set of mobile elements, including wheels and tracks for providing propulsion, where said lower legs are respectively pivotally coupled to said upper legs, and said upper legs are pivotally coupled to a payload base hip section, where the payload base hip section provides a supporting structure for attaching a torso having holding and lifting devices incorporated therewith, where the independence and rotational relationship of the leg sections and the payload base hip section permit the disposition of the center of gravity of a torso of the combined platform, when attached, to be placed in a first position outside the volume of the platform as defined by the sets of legs when configured to take up the maximum amount of surface area, and to permit the relocation of the vertical projection of the center of gravity to within the volume defined by the same leg sections when configured to take up the least amount of area, as in and for the purpose of lifting a foreign object while remaining righted with tractable mobile surfaces ready to propel the vehicle in one direction or another.

What is fundamentally novel in this invention, which novelty enables a completely unobvious, unexpected, highly useful, and in a real sense delightful behavior is the combination of the above mentioned mobile apparatus with a dynamic balancing control system which permits further mobility configuration and locomotion, where the apparatus can readily move from a first position where the vertical projection of the center of gravity of the device is contained within an area defined by the smallest footprint of the device with all leg sections and a torso, when attached, are interfolded one within and ontop of the other, to a second position in which each of the leg sections, and a torso, when one is attached, can be placed colinear with one another by action of the pivot drive system, while rotating into a position substantially vertical, with the vertical projection of the center of gravity being contained in a footprint of the device defined by the tangential contact of the lowest track or wheel structure and the ground.

Therefore, while the delivery of a set of independent tracked leg sections made up from upper and lower leg sections which can be propelled independently and rotated independently is new, and the combination of that apparatus with a dynamic balancing system is a key innovation and is new, yet an additional new element of this invention is the provision of a set of substantially parallel and independent wheels on at least the lower ends of the lower leg assembly, for allowing high speed mobility when on normal terrain in the dynamically balanced substantially vertical position. A hybrid tracked and wheeled platform having the articulated form detailed herein enables navigation over rough terrain by engaging the tracked upper legs, while allowing for the option of high speed wheeled motion over more normal terrain. And another new aspect of this invention is the provision of both wheeled upper and lower leg sections which allow for the same interleaving positions of a torso, the hip, and the leg sections, while offering the benefits of wheeled operation in all three primary states, where the three primary states are: (1) mobile elements of the lower legs in substantially full contact with the ground, with upper legs raised, and with torso raised; (2) lower legs raised, mobile elements of the upper legs substantially in full contact with the ground, with torso raised and substantially overlaying the upper legs; and (3) all sections including a torso if attached, colinear one with the other, with only a single point of contact with the ground defined by the portion of the mobile element of each lower leg with the ground when the apparatus is substantially vertical.

It will be understood that the elements used to rotatably attach the mobility elements to the body sections which may include axles, pins, bearings, hubs, and the like may be conventional in nature, and the individual selection of particular coupling structures and drive mechanisms as well as dynamic balancing control systems are all within the ability of those skilled in the art.

One skilled in the art will also recognize that the importance of controlling the center of gravity of the device will be an integral part of the operation of the invention as herein disclosed and will by its nature depend on the size of the wheels, the length and width of the assemblies that comprise the platform, their state of articulation in serving any goal for the locomotion and any additional behavior in that locomotion, the weight of the integral components that provide for the basic operation of each of the device configurations, and the expected use of the final platform with respect to the full scope in the objective of lifting and extraction. The unexpected deployment of these methods for accomplishing this task for any such embodiment builds on and expands the application specific opportunities and the general body of knowledge that here to fore has been known, the basic aspects of which are within the ability of those skilled in the art.

In accordance with the invention what is provided in a preferred embodiment is a new and improved mobile platform for use as an apparatus for forming a compact mobile robotic device, and it is an object of this invention to provide such new and improved articulated tracked mobile platform, where the articulated tracked platform comprises a payload base hip section, where the payload base hip section has two substantially parallel opposing sides, a right payload base side and a left payload base side, and the payload base hip section further comprises a payload base mounting surface, where the payload base mounting surface is disposed between the right payload base side and the left payload base side, where the payload base mounting surface is disposed substantially orthogonal to two substantially parallel and opposing payload base hip section sides, and where the platform includes a right leg assembly and a left leg assembly, with each leg assembly having an upper leg and a lower leg section, where the right and left leg assemblies each comprise a right and a left upper leg and a right and a left lower leg, with each of said right and left upper legs having a proximal and distal end, and each of said right and left upper legs operating in substantially parallel planes, with the right leg being pivotally coupled at a proximal end to the right side of said payload base hip section and the left of the upper legs being pivotally coupled to the left side of the payload base hip section about a transverse axis generally perpendicular to the parallel opposing sides of the payload base hip section, allowing separate and independent rotation of each of the upper legs about the payload base hip section, where each of the right and left lower legs having a proximal end and a distal end, and each of the right and left lower legs operate in substantially parallel planes, with the right lower leg proximal end being independently and pivotally connected to the distal end of the right upper leg, and the left lower leg proximal end being independently and pivotally connected to a distal end of the left upper leg, allowing rotation of each of the lower legs about each of the upper legs, the platform for attaching a torso section to the payload base mounting surface;

where each of said leg assemblies has mobility elements for propelling the platform with the right and left upper legs have right upper leg track and left upper leg track mobility elements coupled to a corresponding one of each of the upper leg sections, and each of the right and left lower legs further having right lower leg track and left lower leg track mobility elements coupled to a corresponding one of each of the lower leg sections, where the platform includes a mobility element drive system for independently, rotationally propelling said each of the tracks about each of the leg sections in each of a forward and reverse direction, so as to propel the platform in a first mode of locomotion driven on at least one of (1) the right and left upper leg tracks, (2) the right and left lower leg tracks, (3) the right and left upper leg tracks and the right and left lower leg tracks, (4) a portion of the right and left upper leg tracks and the right and left lower leg tracks, (5) a portion of the right and left lower leg tracks and the right and left upper leg tracks, (6) a portion of the right and left upper leg tracks and a portion of the right and left lower leg tracks, and (7) at least one of (1) the right upper and right lower leg tracks of said right leg assembly and a portion of the left upper and left lower leg tracks of the left leg assembly, and (2) the left upper and left lower leg tracks of the left leg assembly and a portion of the right upper and right lower leg tracks of said right leg assembly, and a pivot drive system for rotating each of the lower legs pivotally about each of the upper legs, and for rotating said each of the upper legs pivotally about the payload base hip section, so that the platform can be propelled in a second mode of locomotion driven by (1) the rotation of the right lower leg about the right upper leg, and the rotation of the right upper leg about the rightside of said payload base hip and (2) the rotation of the left lower leg about the left upper leg, and the rotation the left upper leg about the left side of said payload base hip.

In a second embodiment of the platform, the platform has a center of mass and a vertical projection of that center of mass onto the ground, and in this embodiment the platform also includes a dynamic balancing drive interface and control system for enabling the dynamic stability of said platform when moving from at least a first position where the platform is static and at rest, into a second dynamically balanced position in which said each upper leg is rotated into a position in which it is parallel and coplanar with said each lower leg, and further where in this position, only part of each of the lower leg sections has a contact point with the ground at a position defined by a line that is substantially orthogonal to a tangent drawn at the sole point where the lower tracks of the lower legs are in contact with the ground, and where the payload base hip section is held in at least a position in which said vertical projection of the center of gravity of the platform is substantially co-located over the sole contact point with said ground.

Alternative embodiments include one or more of the following features:

In a second embodiment a compact mobile, articulated tracked platform is provided which has most of the features of the above described embodiment, except that each of the leg assemblies have differing mobility elements for propelling said platform where in this embodiment propulsion is on at least said right and left lower legs, wherein each of the right and left lower legs have right lower leg track and left lower leg track mobility elements coupled to a corresponding one of each of said lower leg sections but where the upper leg sections may not have any mobility elements configured as part of that assembly.

Another embodiment provides for this second platform embodiment with dynamic balancing features in combination with the track drive and pivot drive system for joint articulation.

Yet another compact mobile, articulated tracked platform provides for an articulated mobile vehicle in which each of the leg assemblies has different mobility elements for propelling said platform, where in this embodiment, at least each of the right and left lower legs have wheel mobility elements pivotally coupled to a corresponding one of each of the proximal and distal ends of the lower leg sections.

Still another embodiment would comprise the above just referenced embodiment where the platform has a center of mass and a vertical projection therefore, and where the platform includes a dynamic balancing drive interface and control system for enabling the dynamic stability of that platform balancing on the sole contact point of the wheels of the lower legs.

An important embodiment provides for a compact mobile, articulated tracked robot platform for operation on a surface where the complete robot is a combination of a payload base hip section and a torso section for providing scooping and lifting where in combination with a dual leg mobile platform according to the invention, including the full mobility of a dual tracked configuration as well as dynamic balancing for moving from a static position to a dynamically balanced position with a full payload.

As will be seen from the figures and the detailed description which follows, one of the unobvious advantages of this mobile platform over the prior art is the provision of a method for operating the articulated tracked mobile platform for conveying heavy payloads in various maneuvers. One of the more unexpected of those maneuvers that is based on the articulation of the apparatus employing the mobility drive system, is a spider stair climbing maneuver where the apparatus has at least a payload base hip section, and where the payload base hip section has two substantially parallel opposing sides for attaching the articulated leg systems according to the invention, where in this featured embodiment, the leg sections are each tracked, and where said platform includes the mobility element drive system for independently, rotationally propelling each of the tracks about each of the leg sections in each of a forward and reverse direction, and the pivot drive system for rotating each of the lower legs pivotally about each of the upper legs, and for rotating said each of the upper legs pivotally about the payload base hip section, where the method to climb a series of stairs is provided for stairs having a rise in elevation at a first stair and at each subsequent stair including at least a second higher stair, and a third higher stair, said each stair having a horizontal base and a vertical rise and so forth, where the "spider climb" is executed by a sequence of steps starting with supporting said platform on each of said upper legs and the lower legs in a first position with said leg assemblies horizontal at a position ready for ascent in front of a first stair;

where the platform has a center of gravity and a vertical projection of said center of gravity toward ground, and where the platform has a projected stability area defined by the perimeter of points of the contact points of the mobility elements when articulated in extension to their most distal positions with respect to the payload base hip section where the perimeter is formed by a set of intersecting lines which are orthogonal to each of the tangent points of each of the distal contact points, where the behavior is comprised of a series of maneuvers including pivoting a first lower leg and a first upper leg such that said lower leg is substantially horizontal, with said distal end of said first lower leg in contact with said horizontal base of said second stair;

pivoting a second lower leg and second upper leg to lift said payload base hip section so that said payload base hip section makes contact with said first lower step horizontal base section;

pivoting said first lower leg and said first upper leg such that said lower leg is substantially horizontal, with said distal end of said first lower leg in contact with said horizontal base of a third higher stair;

pivoting said left lower leg and said left upper leg so that said payload base hip section makes contact with said second lower step horizontal base section;

and pivoting said second lower leg section and said second upper leg section so that said second lower leg section makes contact with the horizontal portion of said first stair, while maintaining the projection of gravity of the center of gravity of the platform, torso, and payload onto the stair in a position that always falls within a perimeter defined by the furthest most contact points of the respective leg sections with the stairs, the perimeter being the boundary as if a series of orthogonal lines were drawn from each of the leg section contact points in a single plane and connected forming the target area for holding the projection of the center of gravity. In this way, the entire apparatus remains balanced in its progressive maneuver, enabling the handling of extremely heavy loads without adverse effects that slipping of the tracks on the step surfaces might cause. During this operation, the vertical projection of the center of gravity is maintained within the projected stability area throughout enabling stable locomotion along the sequence of stair climbing steps.

It is to be understood that both the foregoing general description and the following detailed description are exemplary and explanatory only, and are not restrictive of the invention as claimed.

BRIEF DESCRIPTION OF THE DRAWINGS

FIG. 22(a-p)—Provides a series of schematic side views of a stair climbing maneuver.

Figure 1:
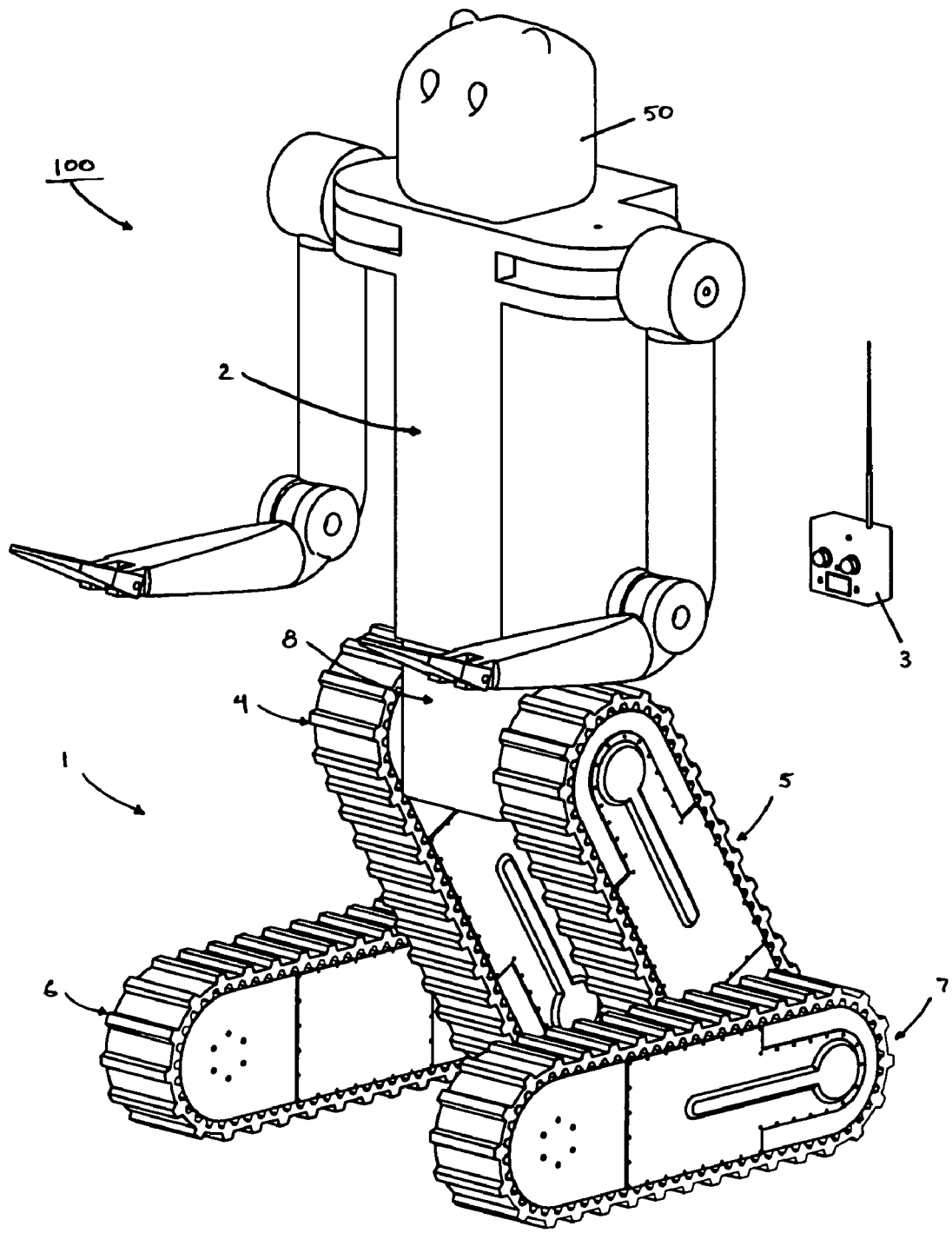
FIG. 1—A perspective view of a preferred embodiment of the robot of this invention.

| | |
|---|---|
| 1 | mobility platform |
| 2 | robotic torso |
| 3 | teleoperator interface |
| 4 | right upper leg |
| 5 | left upper leg |
| 6 | right lower leg |
| 7 | left lower leg |
| 8 | payload base hip section |
| 9 | drive battery |
| 10 | electronics battery |
| 11 | lower leg sensor interface |
| 12 | lower leg power interface |
| 13 | reservoir |
| 14 | pump |
| 15 | electric motor |
| 16 | housing (lower leg) |
| 16' | housing (upper leg) |
| 17 | accumulator |
| 17' | torso accumulator |
| 18 | hydraulic system bracket |
| 19 | upper leg tensioning axle |
| 20 | track |
| 21 | hub motor (lower leg distal) |
| 21' | hub motor (lower leg proximal) |
| 21" | hub motor (upper leg distal) |
| 21'" | hub motor (upper leg proximal) |
| 22 | lower leg tensioning axle |
| 23 | lower leg tensioning axle retainer |
| 24 | hydraulic cylinder (lower leg) |
| 24' | hydraulic cylinder (upper leg) |
| 25 | valve solenoid (lower leg) |
| 25' | valve solenoid (upper leg) |
| 25" | torso valve solenoid |
| 26 | cylinder mount (lower leg) |

-continued

| | | |
|---|---|---|
| 26' | cylinder mount (upper leg) | |
| 27 | valve (lower leg) | |
| 27' | valve (upper leg) | |
| 27" | torso valves | |
| 28 | pivot chain (lower leg) | |
| 28' | pivot chain (upper leg) | |
| 29 | hub cap (lower leg axle) | |
| 29' | hub cap (upper leg axle) | |
| 30 | side plate (lower-outside) | |
| 30' | side plate (lower-inside) | |
| 30" | side plate (upper-outside) | |
| 30''' | side plate (upper-inside) | |
| 31 | access panel (with wire duct) | |
| 31' | access panel | |
| 32 | hip thrust ring | |
| 33 | mid-leg thrust ring | |
| 34 | bearing | |
| 34' | bearing | |
| 34" | bearing | |
| 34''' | bearing | |
| 34'''' | bearing | |
| 35 | pillow block | |
| 36 | hub cap screw | |
| 36' | lower leg tensioning axle screw | |
| 36" | pillow block screw | |
| 36''' | upper leg tensioning axle screw | |
| 36'''' | access panel screw | |
| 36''''' | hydraulic bracket screw | |
| 36'''''' | hub motor housing screw | |
| 37 | upper leg sensor and power interface | |
| 37' | upper leg sensor interface | |
| 37" | upper leg power interface | |
| 38 | encoder read head (upper track position) | |
| 38' | encoder read head (upper leg position) | |
| 38" | encoder read head (lower track position) | |
| 38''' | encoder read head (lower leg position) | |
| 39 | encoder disk (upper track position) | |
| 39' | encoder disk (upper leg position) | |
| 39" | encoder disk (lower track position) | |
| 39''' | encoder disk (lower leg position) | |
| 40 | tire | |
| 41 | hub motor housing | |
| 42 | composite rotor with embeded permanent magnets | |
| 43 | stator | |
| 44 | wires and hydraulic lines | |
| 45 | thrust bearing | |
| 46 | payload retaining nut | |
| 47 | payload base electronics module | |
| 48 | base electronics enclosure | |
| 49 | mound | |
| 50 | head | |
| 51 | hip axle | |
| 52 | payload base mounting surface | |
| 53 | payload base left side | |
| 54 | payload base right side | |
| 55 | GPS magnetometer | |
| 56 | inertial sensors | |
| 57 | teleoperator receiver | |
| 58 | check valve | |
| 59 | particulate filter | |
| 100 | robot | |
| 101 | left leg assembly | |
| 102 | right leg assembly | |
| 200 | torso body | |
| 200' | torso body | |
| 201 | mounting rod | |
| 201' | mounting rod | |
| 202 | upper arm | |
| 202' | upper arm | |
| 203 | lower arm | |
| 203' | lower arm | |
| 204 | hand | |
| 204' | hand | |
| 205 | wrist joint | |
| 205' | wrist joint | |
| 206 | elbow joint | |
| 206' | elbow joint | |
| 207 | shoulder I joint | |
| 207' | shoulder I joint | |
| 208 | shoulder II joint | |
| 208' | shoulder II joint | |
| 209' | upper arm cylinder | |
| 210' | lower arm cylinder | |
| 211' | elbow cylinder | |
| 212' | shoulder cylinder | |
| 900 | computational system | |
| 901 | sensors | |
| 902 | actuators | |
| 903 | power system | |
| 904 | plant | |
| 905 | control system | |
| 906 | derivative operator | |
| 1000 | upper wheeled, lower tracked | |
| 1004 | upper right leg | |
| 1005 | upper left leg | |
| 1006 | lower right leg | |
| 1007 | lower left leg | |
| 1008 | payload base hip section | |
| 2000 | upper proximal wheeled, lower tracked | |
| 2004 | upper right leg | |
| 2005 | upper left leg | |
| 2006 | lower right leg | |
| 2007 | lower left leg | |
| 2008 | payload base hip section | |
| 3000 | upper passive, lower tracked | |
| 3004 | upper right leg | |
| 3005 | upper left leg | |
| 3006 | lower right leg | |
| 3007 | lower left leg | |
| 3008 | payload base hip section | |
| 4000 | upper tracked, lower wheeled | |
| 4004 | upper right leg | |
| 4005 | upper left leg | |
| 4006 | lower right leg | |
| 4007 | lower left leg | |
| 4008 | payload base hip section | |
| 5000 | upper wheeled, lower wheeled | |
| 5004 | upper right leg | |
| 5005 | upper left leg | |
| 5006 | lower right leg | |
| 5007 | lower left leg | |
| 5008 | payload base hip section | |
| 6000 | upper proximal wheeled, lower wheeled | |
| 6004 | upper right leg | |
| 6005 | upper left leg | |
| 6006 | lower right leg | |
| 6007 | lower left leg | |
| 6008 | payload base hip section | |
| 7000 | upper passive, lower wheeled | |
| 7004 | upper right leg | |
| 7005 | upper left leg | |
| 7006 | lower right leg | |
| 7007 | lower left leg | |
| 7008 | payload base hip section | |
| 8000 | upper tracked, lower distal wheeled | |
| 8004 | upper right leg | |
| 8005 | upper left leg | |
| 8006 | lower right leg | |
| 8007 | lower left leg | |
| 8008 | payload base hip section | |
| 9000 | upper wheeled, lower distal wheeled | |
| 9004 | upper right leg | |
| 9005 | upper left leg | |
| 9006 | lower right leg | |
| 9007 | lower left leg | |
| 9008 | payload base hip section | |
| 10000 | upper distal wheeled, lower distal wheeled | |
| 10004 | upper right leg | |
| 10005 | upper left leg | |
| 10006 | lower right leg | |
| 10007 | lower left leg | |
| 10008 | payload base hip section | |
| 11000 | asymmetric mobility elements I | |
| 11004 | upper right leg | |
| 11005 | upper left leg | |
| 11006 | lower right leg | |
| 11007 | lower left leg | |
| 11008 | payload base hip section | |

-continued

| | |
|---|---|
| 12000 | asymmetric mobility elements II |
| 12004 | upper right leg |
| 12005 | upper left leg |
| 12006 | lower right leg |
| 12007 | lower left leg |
| 12008 | payload base hip section |

DETAILED DESCRIPTION

Embodiments of the present invention will be described below with reference to the accompanying drawings. It should be understood that the following description is intended to describe exemplary embodiments of the invention, and not to limit the invention.

It is understood that the present invention is not limited to the particular system components, analysis techniques, etc. described herein, as these may vary. It is also to be understood that the terminology used herein is used for the purpose of describing particular embodiments only, and is not intended to limit the scope of the present invention. It must be noted that as used herein and in the appended embodiments, the singular forms "a," "an," and "the" include plural reference unless the context clearly dictates otherwise.

Unless defined otherwise, all technical and scientific terms used herein have the same meanings as commonly understood by one of ordinary skill in the art to which this invention belongs. Preferred methods, system components, and materials are described, although any methods and materials similar or equivalent to those described herein can be used in the practice or testing of the present invention. All references cited herein are incorporated by reference herein in their entirety.

All publications and patents mentioned herein are incorporated herein by reference for the purpose of describing and disclosing, for example, the system components and methods that are described in the publications, which might be used in connection with the presently described invention. The publications discussed herein are provided solely for their disclosure prior to the filing date of the present application. Nothing herein is to be construed as an admission that the inventors are not entitled to antedate such disclosure by virtue of prior invention or for any other reason.

DETAILED DESCRIPTION

Referring to FIG. 1, an embodiment of the system with robot 100 and teleoperator interface 3. Robot 100 traverses its environment on an articulated platform consisting of independent right and left sides, the right side consisting of an upper leg 4 and lower leg 6 and the left side consisting of an upper leg 5 (identical to 4) and lower leg 7 (identical to 6). The upper legs are pivotally attached to the payload base hip section 8 on which a payload can be mounted. The upper leg members 4 and 5 can rotate independently around the joint that connects them with the payload base hip section 8 and can be positioned at any angle to the payload base hip section 8. Each lower leg members 6 and 7 can rotate independently around the mid-leg joint with respect to their upper leg member and can be positioned at any angle to its respective upper leg. Simultaneously and independently the drive element of each leg member can be driven in either direction. Robot 100 is symmetrical about the sagittal plane.

Robot 100 is designed to traverse a variety of environments, rural and urban, and overcome a variety of obstacles including stairs, rocks, and holes. Robot 100 is also designed to fit through doorways and negotiate stairwells.

Figure 2:
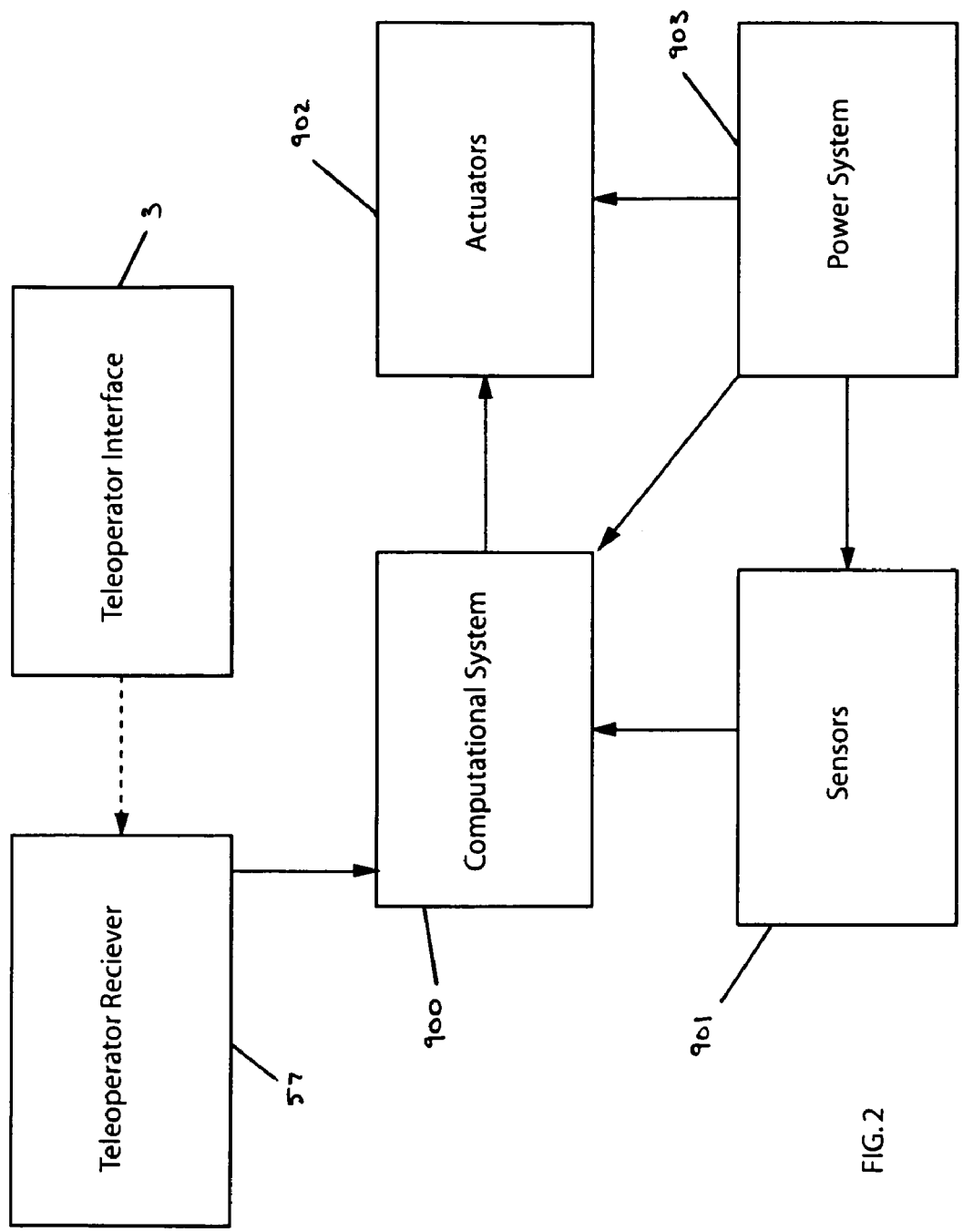
FIG. 2—A block diagram of the control and system components of the robot of FIG. 1.

Referring to FIG. 2, the robot can be divided into five subsystems by function. The teleoperator interface 3 transmits operator commands to the control system via a wireless link. The teleoperator receiver 57 receives the operator commands via the wireless link and transmits the signals to the computational system 900. The computational system 900 also receives exteroceptive and proprioceptive state information from the sensors 901. The computational system 900 then operates on the operator commands and state information according to control rules. The results of these operations are provided to the actuators 902 in the form of control signals. This process is repeated continuously throughout operation. The power system 903 shares power in the form of electrical current and voltage and hydraulic pressure and flow with the actuators 902, the sensors 901 and the computational system 900.

Figure 7:
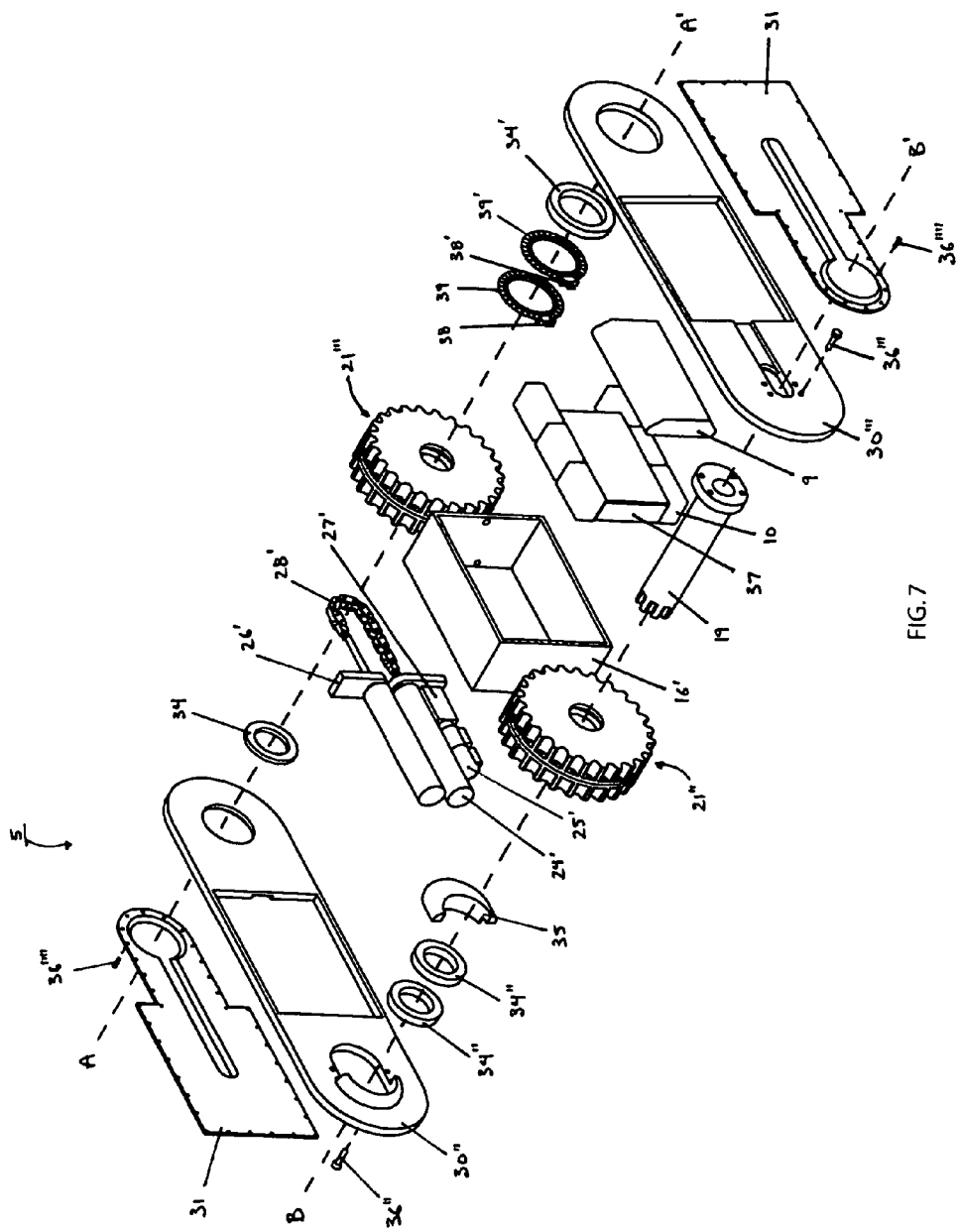
FIG. 7—Is an exploded view of upper leg assembly of FIG. 6.
Figure 7A:
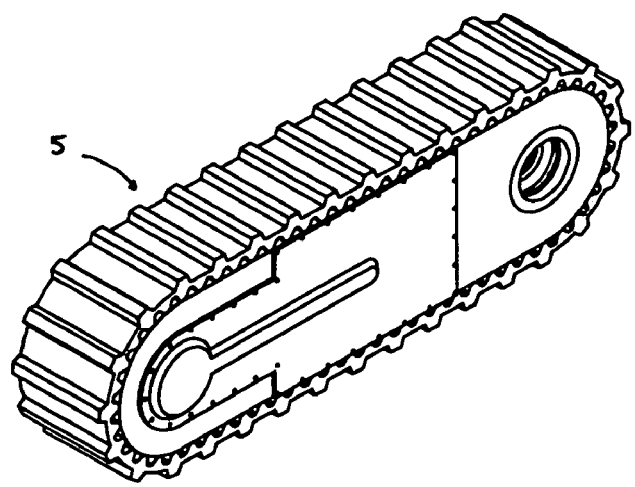
FIG. 7a—Provides an exploded view of upper leg of FIG. 7 with the flexible track attached.
Figure 7B:
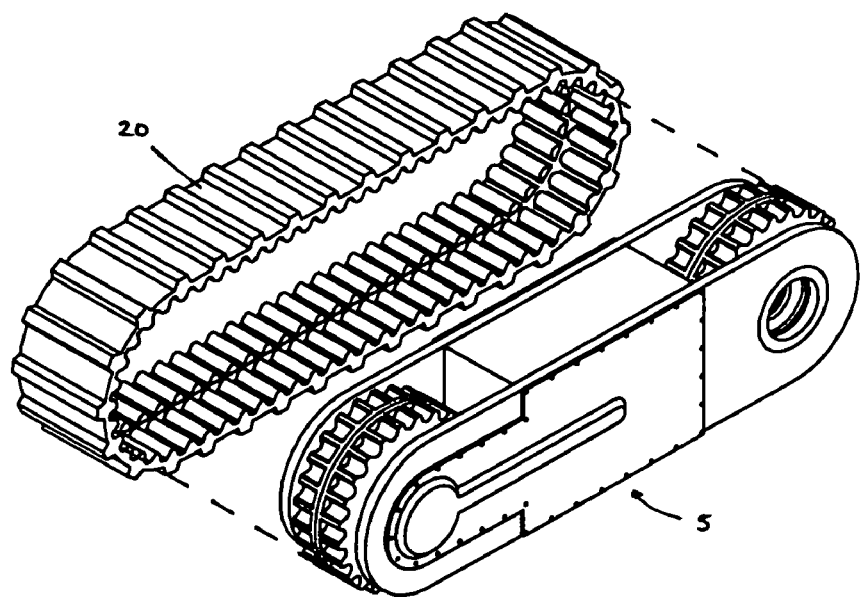
FIG. 7b—Provides an exploded view of upper leg of FIG. 7 with the flexible track removed.

Referring to FIG. 7, the housing 16' in the left upper leg 5 contains the upper leg interface 37, the electronics batteries 10, the drive battery 9, the hydraulic cylinders 24' which are mounted to the housing through the cylinder mounts 26' which are welded to the housing 16', and the valve 27' which controls the hydraulic flow to the cylinders 24' by actuation of the valve solenoids 25'. The housing 16' is welded to the side plates 30" and 30'" and access to the housing unit 16' is achieved through access panels 31 which screw to the side plates 30" and 30'". An alternate method for attaching the housing 16 is to bolt it to the side plates 30" and 30'".

The upper leg tensioning axle 19 is securely fastened to the side plate 30'" by screws. The hub motor 21" at the distal end of the upper leg 5 slides onto the upper leg tensioning axle 19 and then two bearings 34" which are secured into the bearing seat of the side plate 30" by a pillow block 35 which is screwed in place. The proximal end of the upper leg 5 slides onto the hip axle 51 of the payload base hip section 8. The bearing 34' rests in the bearing seat of the side plate 30'". The encoder disk 39' for determining the position of the upper leg 5 in relation to the hip axle 51 is fit onto the axle and the encoder read head 38' is mounted to the side plate 30'". The encoder disk 39 which determines the position of the hub motor 21'" in relation to the hip axle 51 is fit onto the axle followed by the hub motor 21'". The encoder read head 38 is mounted to the side of the hub motor 21'". The pivot chain 28' engages the splined section of the hip axle 51 and the ends of the pivot chain 28' are attached to the ends of the rods of the hydraulic cylinders 24'. The bearing 34 is fit onto the axle in the bearing seat of the side plate 30".

The assembly of the right upper leg 4 is identical to the assembly of the left upper leg 5 described above.

Figure 8:
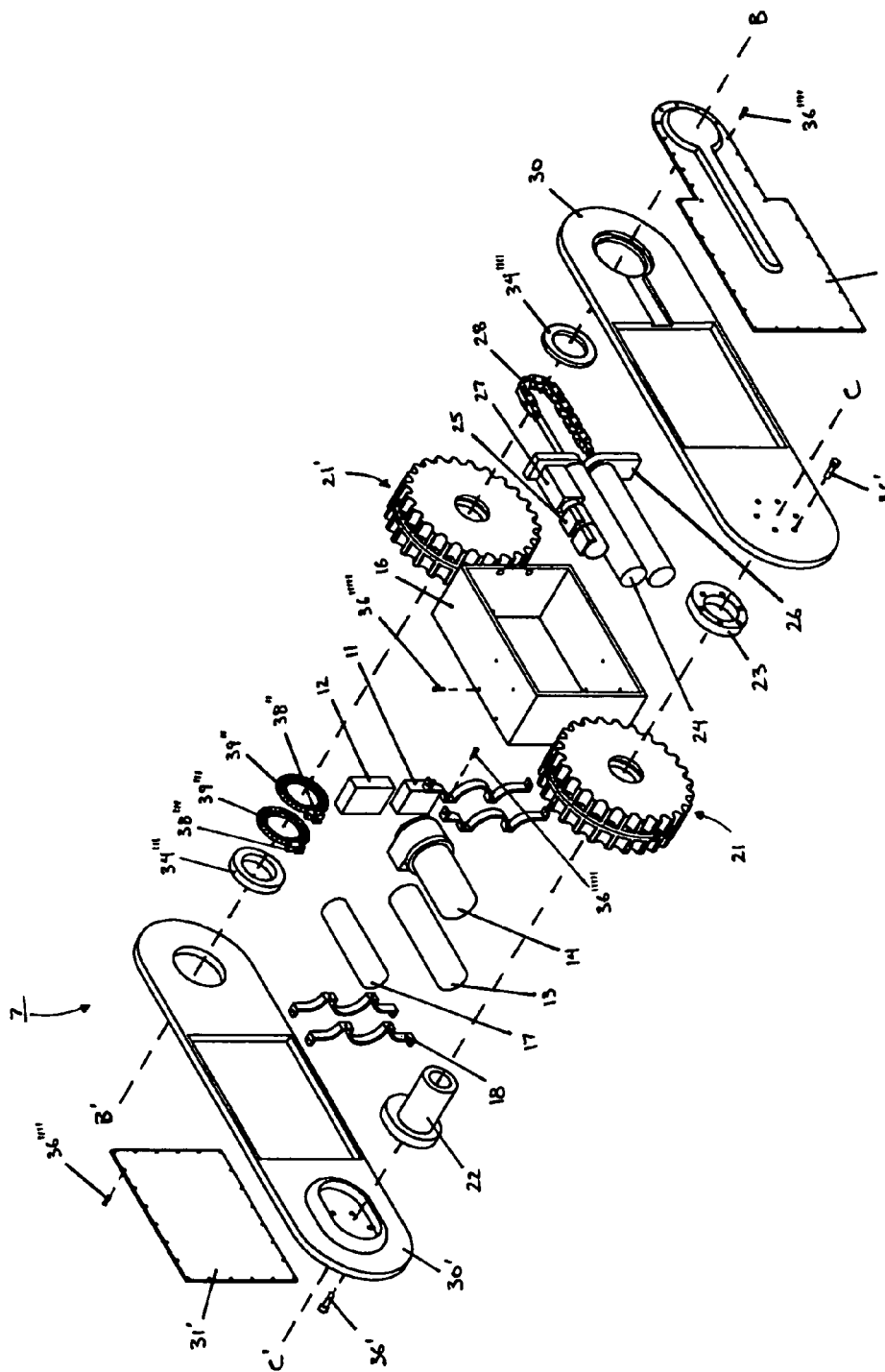
FIG. 8—Is an exploded view of the owner leg assembly of FIG. 6.
Figure 8A:
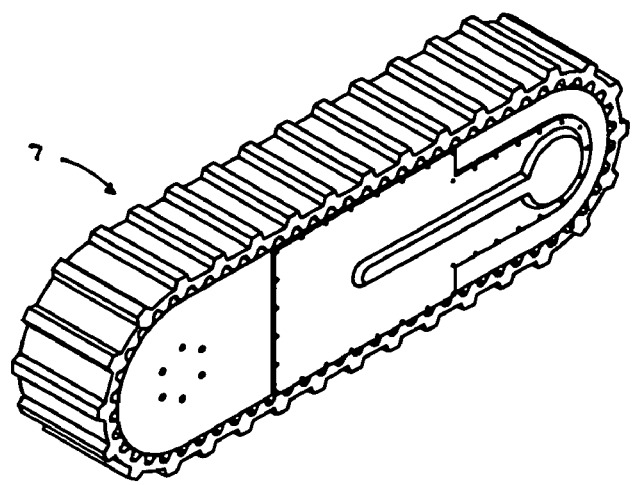
FIG. 8a—Provides an exploded view of upper leg of FIG. 7 with the flexible track attached.
Figure 8B:
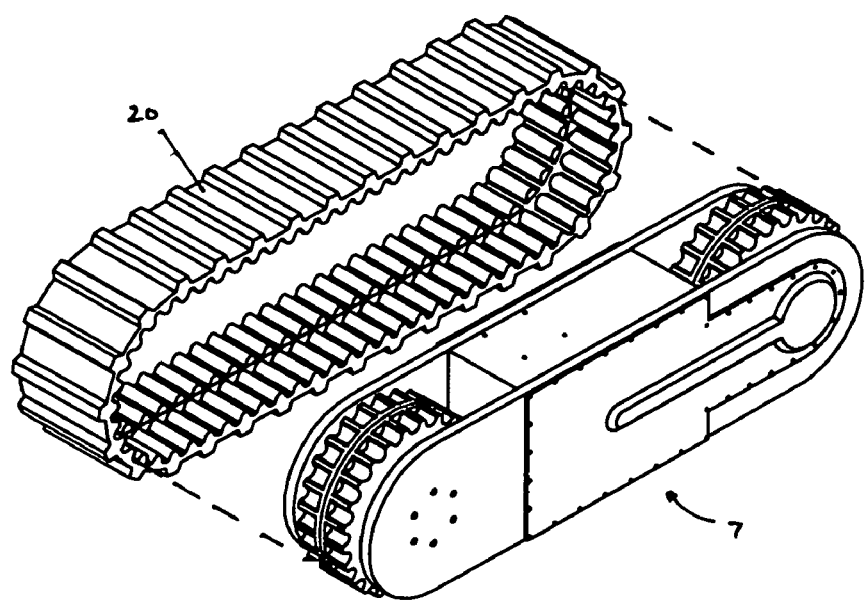
FIG. 8b—Provides an exploded view of upper leg of FIG. 7 with the flexible track removed.

Referring to FIG. 8, the housing 16 in the left lower leg 7 contains the lower leg sensor interface 11, the lower leg power interface 12, the reservoir 13, pump 14, and accumulator 17 which are held together and secured into the housing 16 by the hydraulic system brackets 18, the hydraulic cylinders 24 which are mounted to the housing through the cylinder mounts 26 which are welded to the housing 16, and the valve 27 which controls the hydraulic flow to the cylinders 24 by actuation of the valve solenoids 25. The housing 16 is welded to the side plates 30 and 30' and access to the housing 16 is achieved through access panels 31 and 31' which screw to the side plates 30 and 30' respectively. An alternate method for attaching the housing 16 is to bolt it to the side plates 30 and 30'.

The lower leg tensioning axle 22 is securely fastened to the side plate 30' by screws. The hub motor 21 at the distal end of the lower leg 7 slides onto the lower leg tensioning axle 22. The lower leg tensioning axle retainer 23 is attached by screws to the side plate 30 and holds the lower leg tensioning axle 22 in place. The proximal end of the lower leg 7 slides onto the upper leg tensioning axle 19. The bearing 34''' rests in the bearing seat of the side plate 30'. The encoder disk 39''' for determining the position of the lower leg 7 in relation to the upper leg tensioning axle 19 is fitted onto the axle and the encoder read head 38''' is mounted to the side plate 30'. The encoder disk 39'' which determines the position of the hub motor 21' in relation to the upper leg tensioning axle 19 is fitted onto the axle followed by the hub motor 21'. The encoder read head 38'' is mounted to the side of the hub motor 21'. The pivot chain 28 is positioned on the splined section of the upper leg tensioning axle and the ends of the pivot chain 28 are attached to the ends of the rods of the hydraulic cylinders 24. The bearing 34'''' is fitted onto the axle in the bearing seat of the side plate 30.

The assembly of the right lower leg 6 is identical to the assembly of the left lower leg 7 described above.

Figure 6:
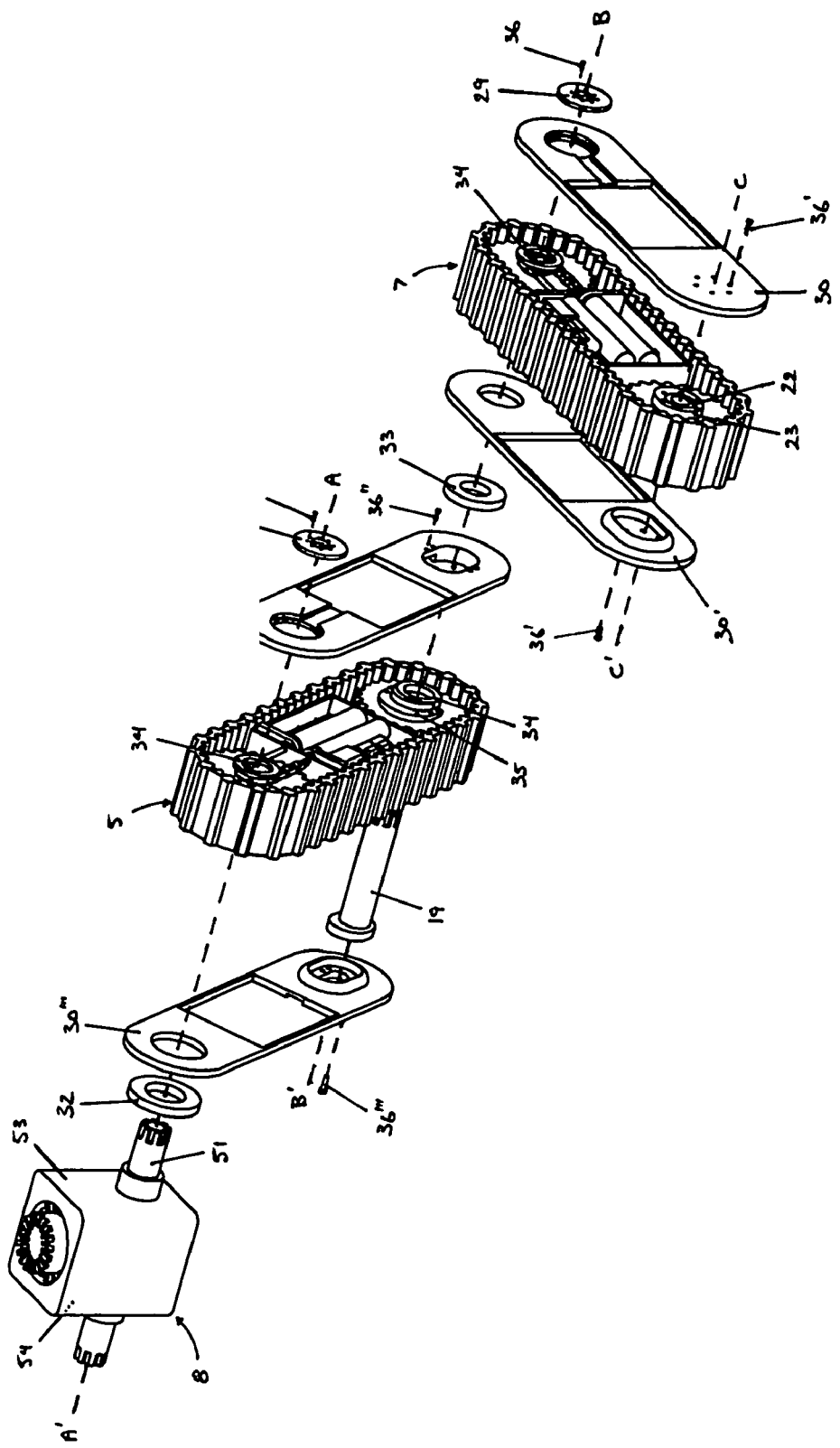
FIG. 6—Is an exploded view of payload base, upper leg, and lower leg assemblies of FIG. 1.

Referring to FIG. 6, the hip thrust ring 32 provides adequate spacing for the access panel 31 during rotation of the left upper leg 5. The upper leg 5 is securely held on the hip axle 51 by the hub cap 29' which is attached to the end of the hip axle 51 by screws 36. The upper leg tensioning axle 19 supports the distal end of the upper leg 5 and the proximal end of the lower leg 7. The upper leg tensioning axle 19 is rigidly secured by screws 36" to the side plate 30''' of the upper leg 5. The mid-leg thrust ring 33 provides adequate spacing between access panel 31 of the upper leg 5 and access panel 31' of the lower leg 7 during rotation of the lower leg 7 around the upper leg tensioning axle 19. The lower leg 7 is securely held on the upper leg tensioning axle 19 by the hub cap 29 which is attached to the end of the upper leg tensioning axle 19 by screws 36".

The assembly of the right upper leg 4 and right lower leg 6 to the payload base hip section 8 and each other is identical to the assembly of the left upper leg 5 and left lower leg 7 and payload base hip section 8 described above.

Referring to FIGS. 6, 7*a*, 7*b*, 8*a*, and 8*b*, the track 20 is placed onto and removed from the hub motors 21, 21', 21", 21''' by unscrewing the tensioning axles 19, 22 and moving the axle forward. The track has a groove in which the center of the hub motors 21, 21', 21", 21''' sits to keep the track aligned. The axles are moved back out and screwed back into place to properly tension the track. The side plates are made of a lubricous, friction reducing material such as acetal polymer to reduce wear on the tracks while providing support.

Figure 3:
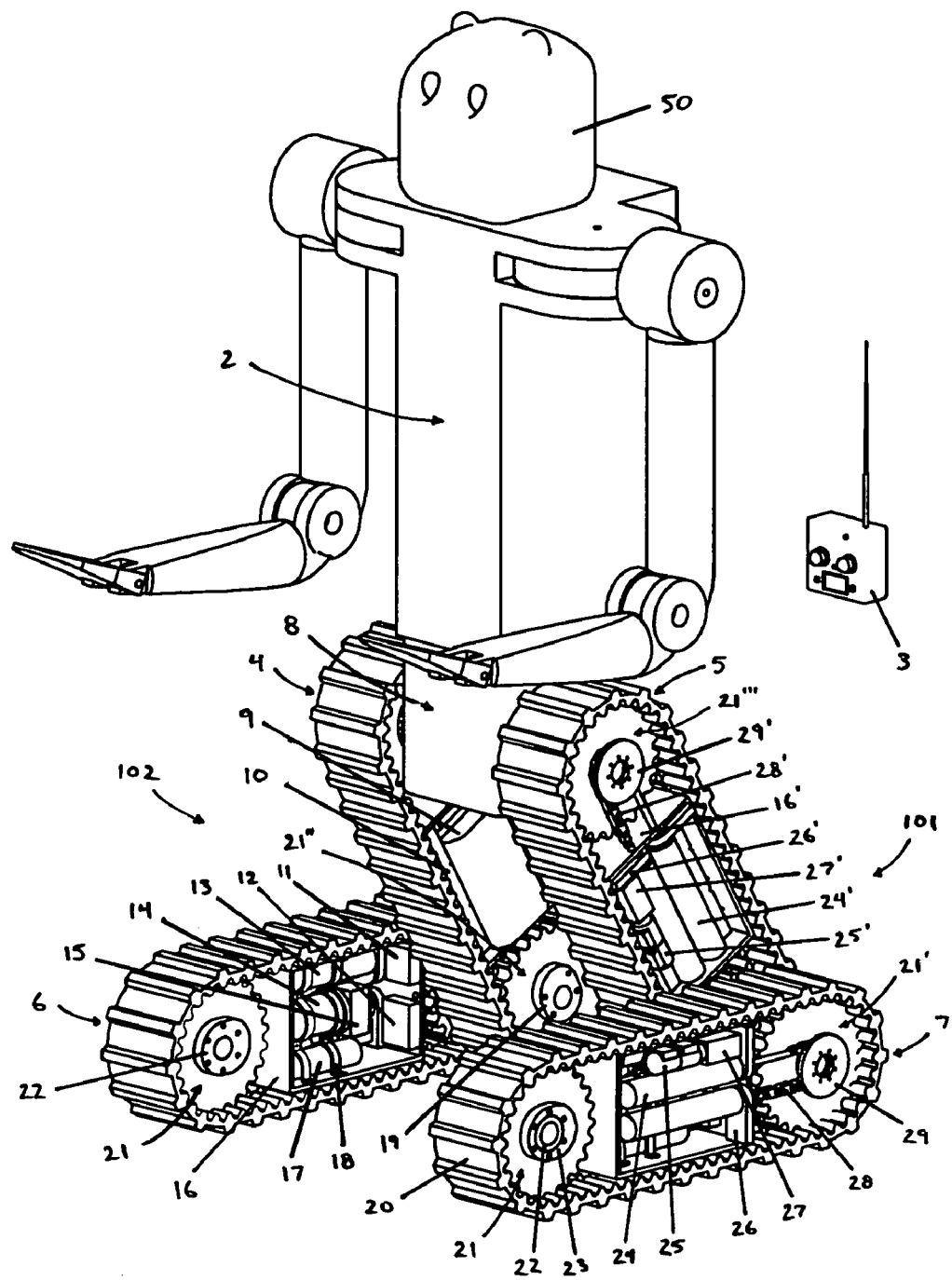
FIG. 3—Is a perspective view of the robot of FIG. 1 with the track apparatus in skeletal form.
Figure 4:
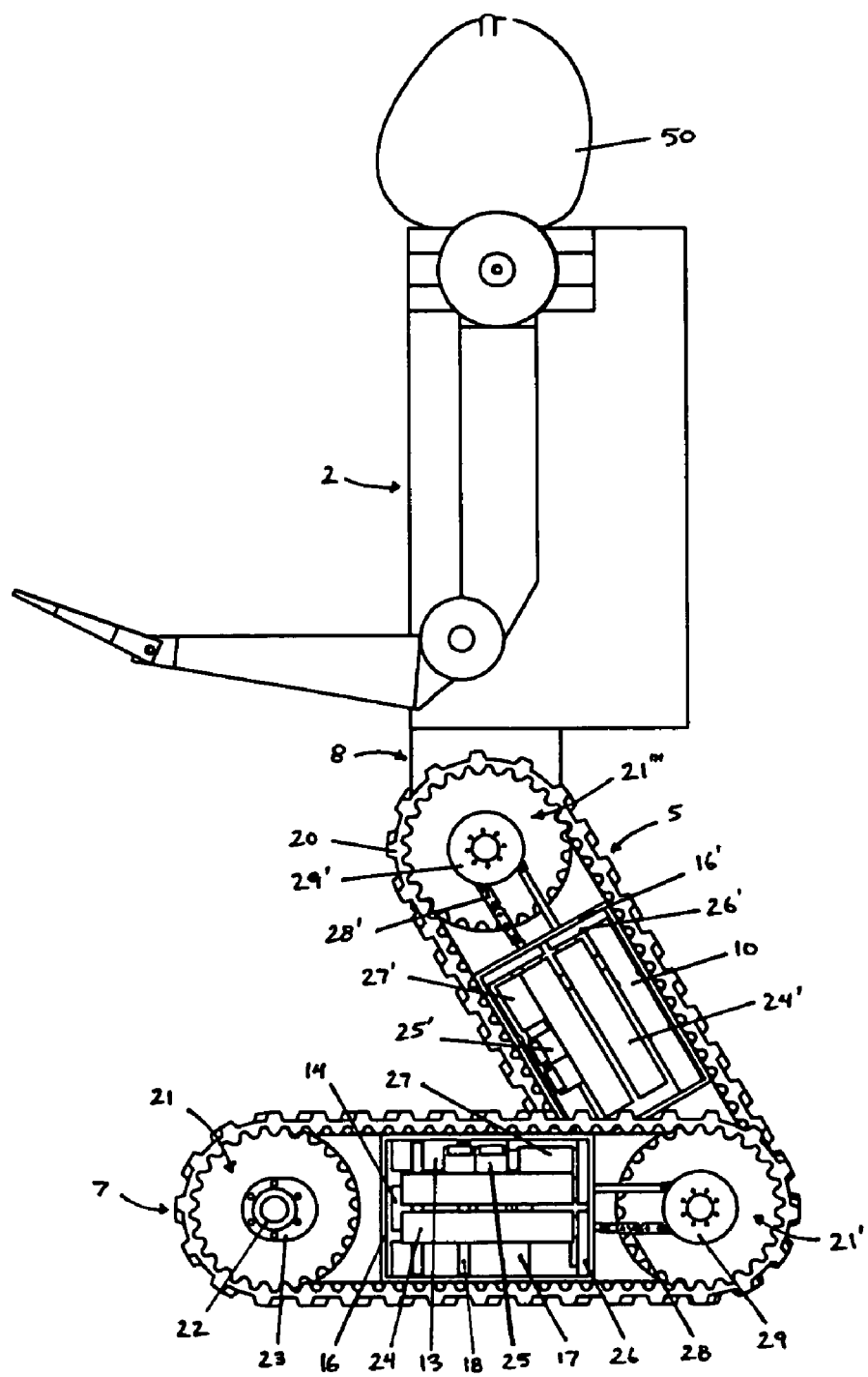
FIG. 4—Is a side view of robot of FIG. 1 with the track apparatus in skeletal form.
Figure 5:
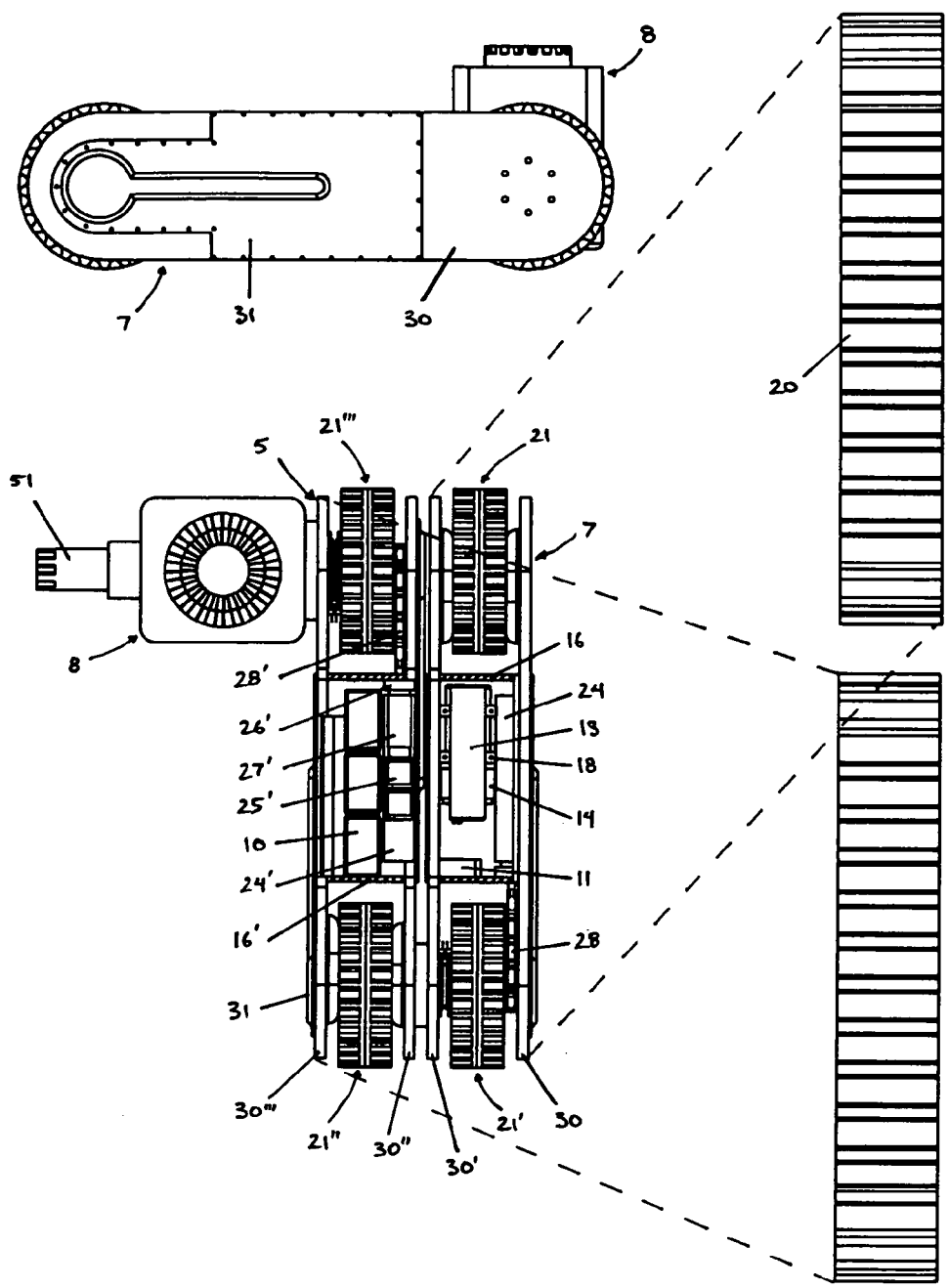
FIG. 5—Is a top view of the robot of FIG. 1 with the mobility platform in skeletal form.
Figure 14:
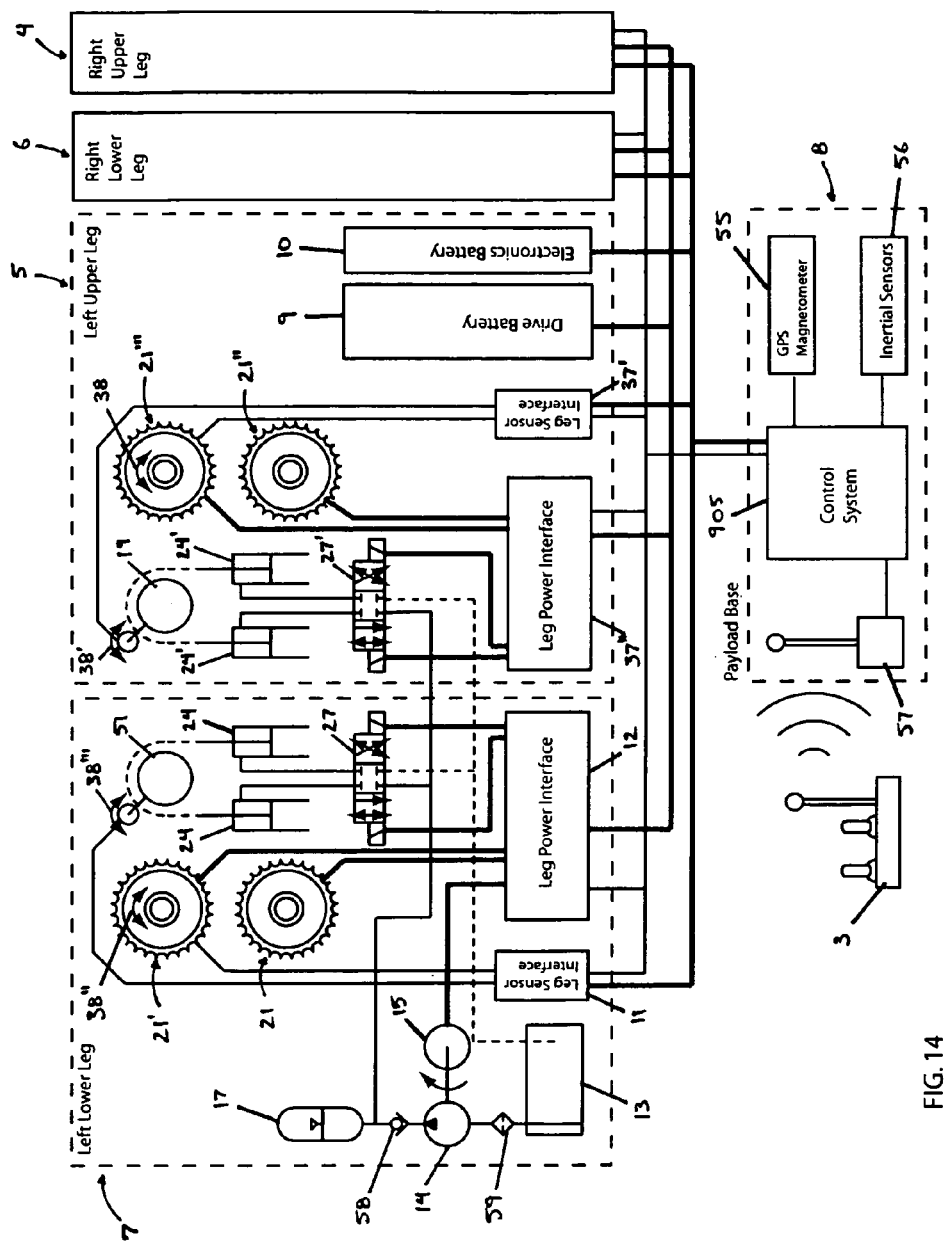
FIG. 14—Is a schematic of the electronic and hydraulic components for the robot of FIG. 1

Referring to FIGS. 3, 6, and 14, the second mode of locomotion of robot 100 is pivoting around the axes "A" and "B". The hip axle 51 is rigidly attached to the left payload base side 53 of the payload base hip section 8. The relative rotation of the upper leg 5 around the hip axle 51 (axis "A") is achieved by operation of the four-way three-position valve 27' which allows hydraulic pressure to drive the antagonistic pair of hydraulic cylinders 24'. The rods cylinders 24' are attached to two ends of a pivot chain 28' which engages the splined end of the hip axle 51. As the rod cylinders are driven, the pivot chain causes the upper leg 5 to relatively revolve around the revolute axis "A". The same pivot drive system is used to relatively rotate the lower leg 7 around the upper leg axle 19 (axis "B"). Each relative rotation is slightly greater than 360 degrees determined by the length of the pivot chain and the circumference of the axle.

Figure 9:
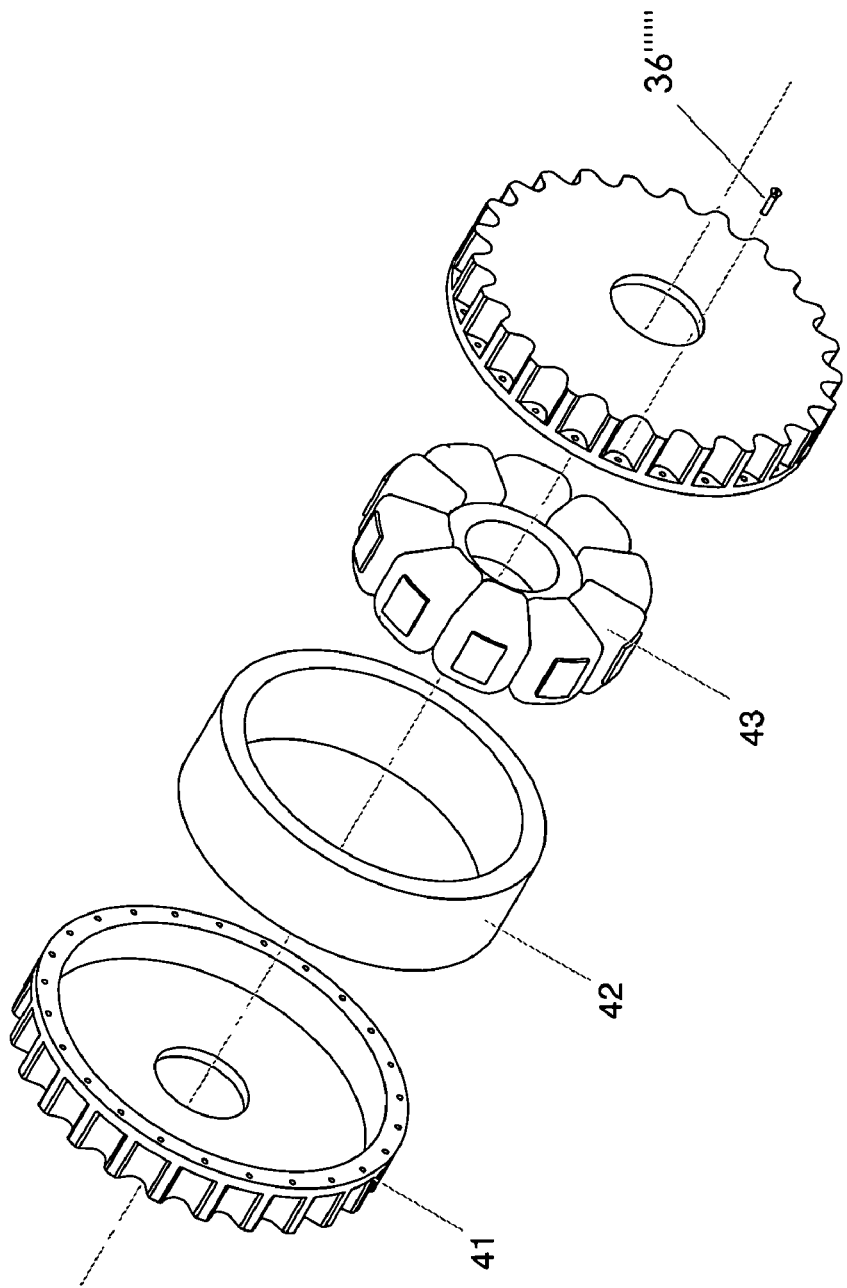
FIG. 9—Is an exploded view of hub motor assembly.

Referring to FIGS. 8 and 9, the first mode of locomotion of robot 100 is driving the mobility elements of the legs. Each of the two hub motors 21, 21' in the lower leg 7 are driven with the same signal. Since the stator 43 of hub motor 21' is stationary with respect to the upper leg tensioning axle 19, and the stator 43 of hub motor 21 is stationary with respect to the lower leg tensioning axle 22, and the composite rotor with embedded permanent magnets 42 moves as the windings of the stator 43 are energized, the track 20 is able to move forwards or backwards independent of the axle. The same mechanism is used to drive the track 20 of all the other leg members 4, 5, 6. The hub motors 21, 21' brake by retarding the phase of the windings in the stator 43. The hub motors 21, 21' are locked in place by keeping the windings of the stator 43 energized in a single state. The hub motors 21, 21' are allowed to rotate freely when the windings of the stator 43 are de-energized.

Another configuration for driving with a track is to use a single hub motor 21 on one axle and a completely passive wheel on the other axle.

Figure 9A:
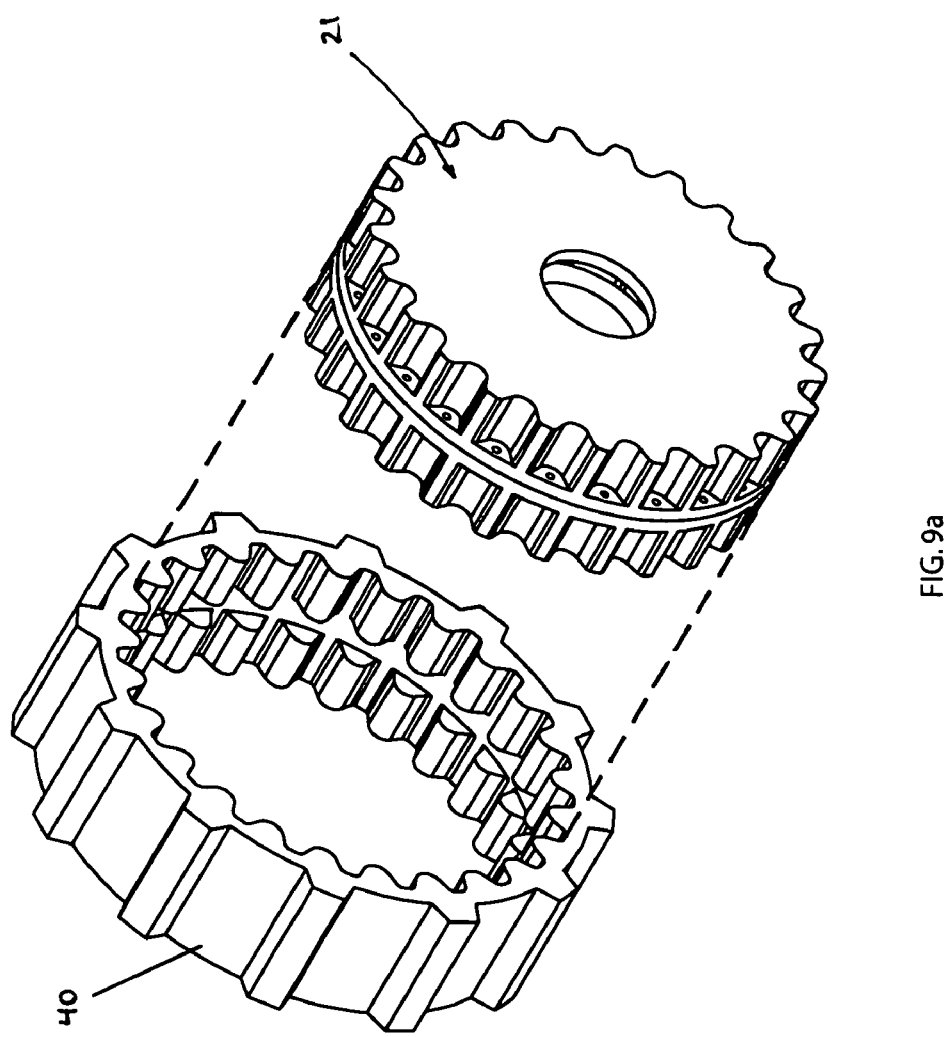
FIG. 9a—Is an exploded view of wheel with a hub motor having a flexible tire unattached.

FIG. 9*a*, demonstrates that a hub motor 21 can be outfitted with a tire 40 (instead of a track) giving the option of wheeled leg members. Tire 40 is made of a pliable material and is stretched over the hub motor, fitting into the groove. The assembly of tire 40 and hub motor 21 is referred to hereon as a wheel.

Figure 10:
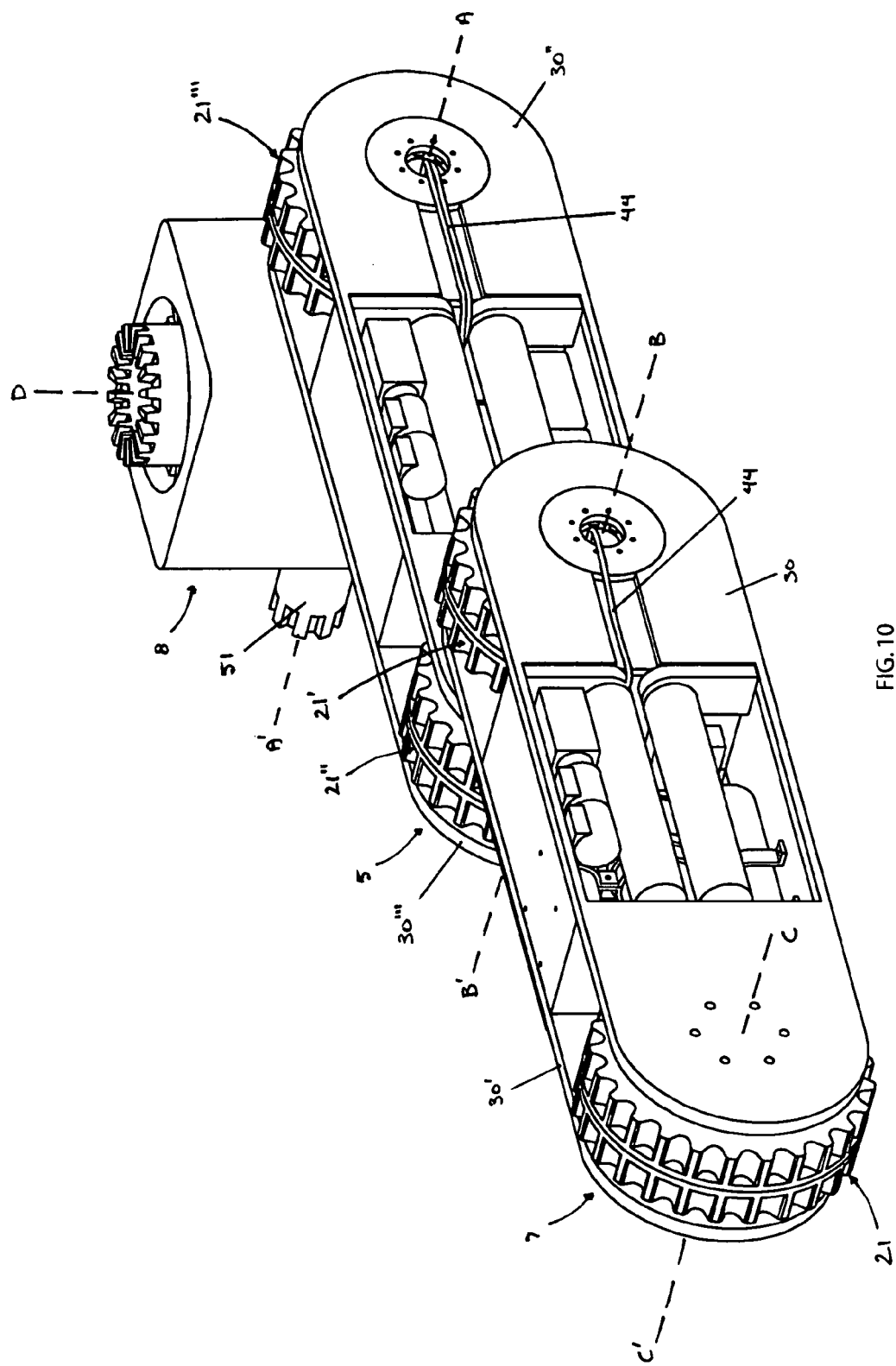
FIG. 10—Shows the electrical wiring and hydraulic lines routing through the robot of FIG. 1.

Referring to FIG. 10, the routing of wires and hydraulic lines 44 through the robot 100 is robust to the rotational motion of the leg members around the joints. This is achieved by passing the wires and hydraulic lines 44 through the axes of rotation and then routing them down the wiring ducts built into the side plates 30, 30", 30'''. The hub motors 21, 21', 21", 21''' are provided power through access holes in the axles (not shown).

Figure 11:
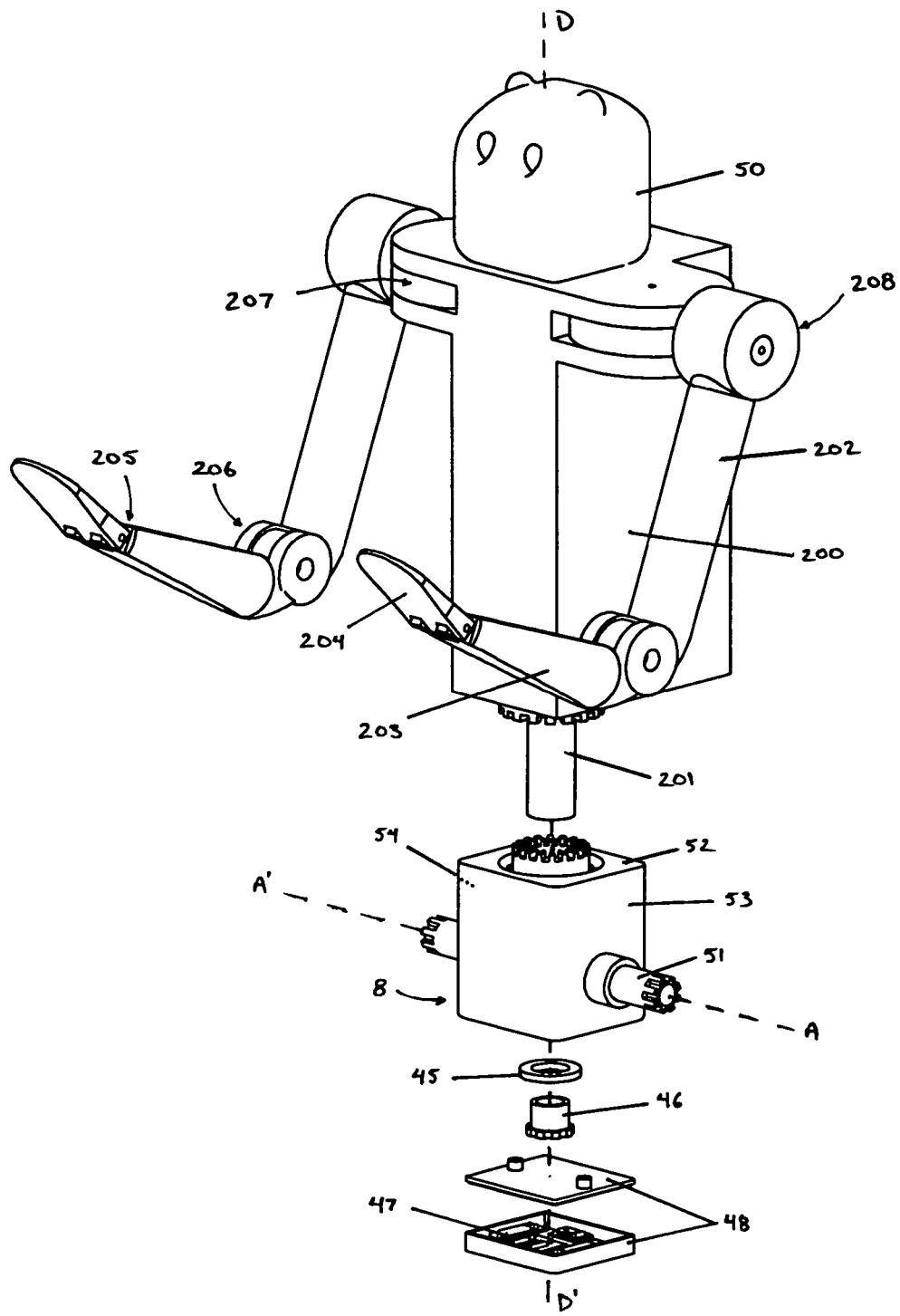
FIG. 11—Shows an exploded view of the payload base and payload torso of FIG. 1.
Figure 12:
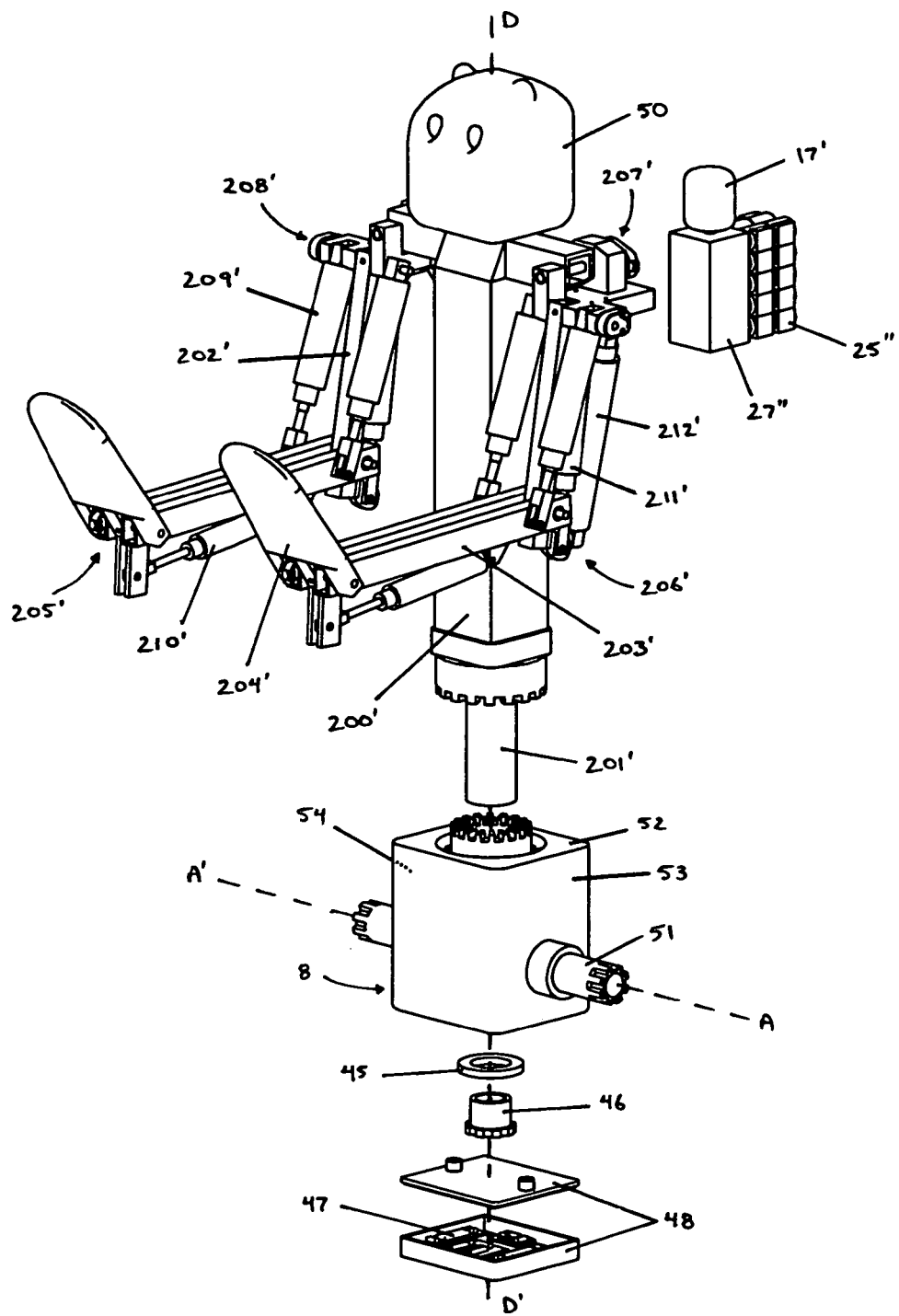
FIG. 12—Shows an exploded view of a payload base and alternative lifting payload torso.
Figure 13:
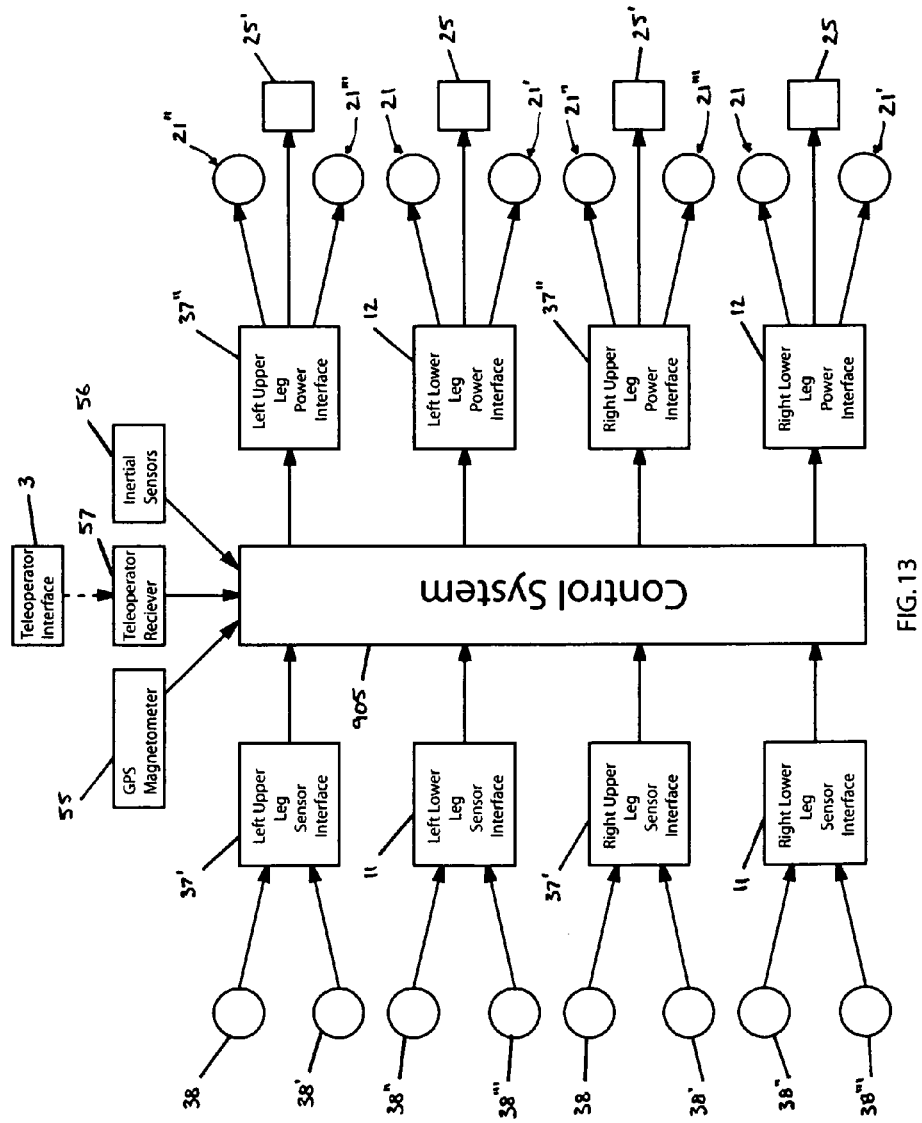
FIG. 13—Is an expanded schematic of system components of FIG. 2.

Referring to FIGS. 11, 12, and 13, the payload 2 has a mounting post 201 at the distal end which passes through a central opening of the payload base hip section 8. The mounting surfaces align and a thrust bearing 45 and payload retaining nut 46 secure the payload 2 to the payload base hip section 8. The payload base electronics module 47, containing the control system 905, GPS—magnetometer sensor 55, and inertial sensors 56, is packaged in the base electronics enclosure 48 which is secured in the bottom of the payload base hip section 8. FIG. 12 depicts a second option for a payload torso 2' with mobility elements capable of lifting loads.

Referring to FIG. 13, operator commands are transmitted from the teleoperator interface 3 to the teleoperator receiver 57. These commands are relayed from the teleoperator receiver 57 to the control system 905. The control system 905 receives joint and track position information from each leg segment via a leg sensor interface 11, 37'. The leg sensor interfaces 11, 37' receive track position information from the track position sensors 38, 38". The leg sensor interfaces 11, 37' receive joint position information from the joint position sensors 38', 38'''. The control system 905 receives compass heading and location information from the GPS—magnetometer sensor 55, and body attitude and rotational velocity information from the inertial sensors 56. The control system 905 operates on the sensor information and operator commands according to control rules. The results of these operations are made available to the leg power interface 12, 37" in the appropriate leg. The leg power interface 12, 37" applies power to the hub motors 21,21', 21", 21''' and to the coils of the hydraulic valves 25, 25' according to the control rule results received from the control system 905.

Referring to FIG. 14, operator commands are transmitted from the teleoperator interface 3 to the teleoperator receiver 57. These commands are relayed from the teleoperator receiver 57 to the control system 905. The control system 905 receives joint and track position information from each leg segment via a leg sensor interface 11,37'. The leg sensor interfaces 11, 37' receive track position information from the track position sensors 38, 38'', which are co-axial with hub motors 21' and 21'''. The leg sensor interfaces 11, 37' receive joint position information from the joint position sensors 38', 38'''. The control system 905 receives compass heading and location information from the GPS—magnetometer sensor 55, and body attitude and rotational velocity information from the inertial sensors 56. The control system 905 operates on the sensor information and operator commands according to control rules. The results of these operations are made available to the leg power interface 12, 37'' in the appropriate leg. The leg power interface 12, 37'' applies power to the hub motors 21, 21', 21', 21'', and to the hydraulic valves 27, 27', according to the control rule results received from the control system 905.

The hydraulic pump 14 is powered by an electric motor 15. The hydraulic pump 14 draws fluid from a sealed variable-volume reservoir 13 through a particulate filter 59. The hydraulic pump discharges through a check valve 58 which serves to maintain system pressure and prevent pump back-driving during quiescent periods. The check valve 58 connects the pump 14 with the accumulator 17. The accumulator 17 maintains system pressure in the presence of rapid load fluctuations. The four-way three-position valve 27, 27' allows hydraulic pressure to drive the antagonistic pair of hydraulic cylinders 24, 24' in such a way as to cause revolute axes 19 and 51 to rotate as the control system directs.

Electrical power is supplied to the leg sensor interfaces 11, 37' and the control system 905 by the electronics battery 10, contained in each of the upper leg segments. Electrical power is supplied to the leg power interfaces 12, 37'' by the drive battery 9, contained in each upper leg segment.

Figure 15:
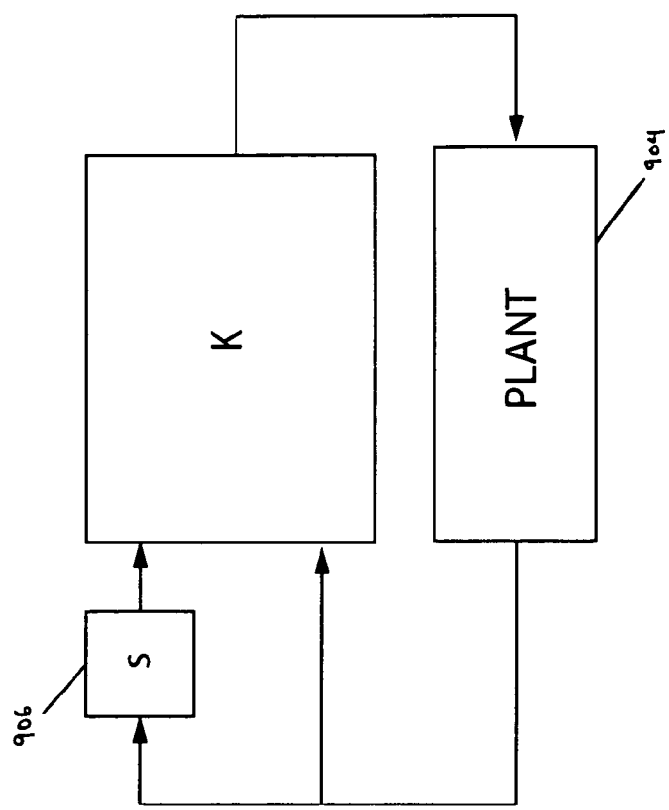
FIG. 15—Provides a block diagram of the control loop for establishing dynamic balancing.

FIG. 15 represents the balancing control system. The block labeled "PLANT" 904 represents the balancing mobility platform.

The input signals to the plant are the torques commanded for each side of the mobility platform, hereafter referred to as $T_{left}$ and $T_{right}$, and the leg length differential hereinafter referred to as $L_{diff}$. The output signals from the plant consist of direction cosines $\theta_x$, $\theta_y$, $\theta_z$, distance x and angle $\phi$. The direction cosines describe a unit vector in the direction of gravity with respect to a dextral orthonormal coordinate system defined by the sagittal plane projection of the line between the ground contact center of pressure and the center of mass and the left-pointing normal to the sagittal plane. The distance 'x' is the distance between the ground contact center of pressure and the operator designated goal point. The angle $\phi$ being the angle between the line connecting the ground contact center-of pressure with the operator designated goal point, and a line through the ground contact center of pressure in the direction of the cross product between the left-pointing normal to the sagittal plane which contains the center of mass and the direction of the projection in the sagittal plane of the line connecting the center of mass with the ground contact center-of-pressure.

The derivatives of direction cosines $\theta_x$, $\theta_y$, $\theta_z$, distance x and angle $\phi$, with respect to time, are computed by the derivative operator 906. The signals and their derivatives are multiplied by matrix K as shown. The values populating the matrix K are chosen during operation to accommodate changes in vehicle posture, payload mass and payload location.

The result of the matrix multiplication is then fed to the plant in the form of a commanded torque $T_{left}$ and $T_{right}$ and commanded length differential $L_{diff}$, thereby producing the desired balancing behavior.

The torque command is distributed among the relevant hub motors. Torque is distributed only to those hub motors which are acting on the ground. In acting tracked segments with two hub motors, the torque is distributed evenly between the two motors. In acting wheeled segments, torque is directed to the wheels which are in contact with the ground.

In configurations where the upper and lower mobility platform leg segments are in contact with the ground, the commanded torque is shared between the two segments. The torque is divided evenly between the two segments.

The length differential command is fed to the computational system which determines the appropriate actuation of the cylinders in the leg members.

Figure 16A:
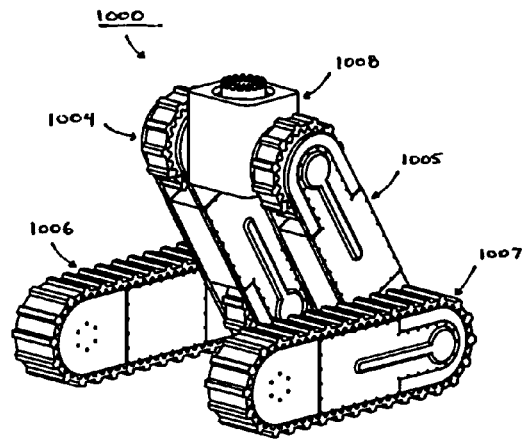
FIG. 16a—An alternative embodiment showing tracked lower legs and wheeled upper legs.
Figure 16B:
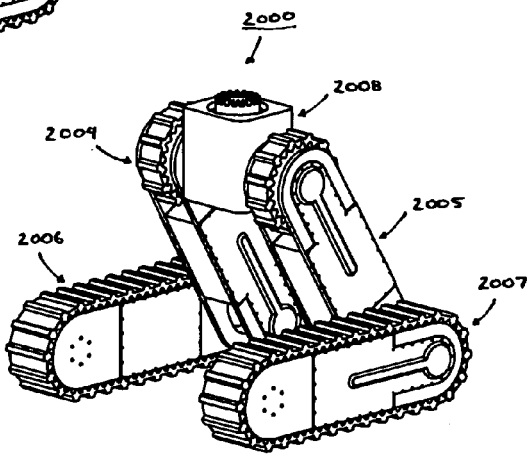
FIG. 16b—An alternative embodiment showing tracked lower legs and partially wheeled upper legs.
Figure 16C:
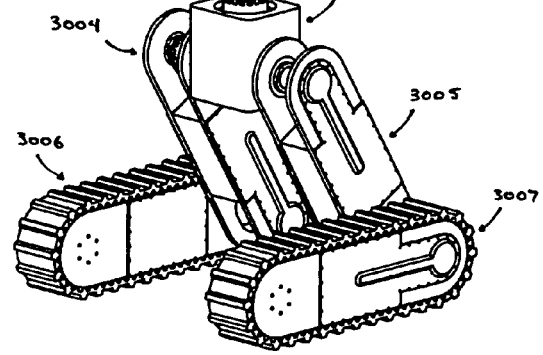
FIG. 16c—An alternative embodiment showing tracked lower legs in combination with an upper leg with no mobility elements.
Figures 16D, 16E, 16F, 16G:
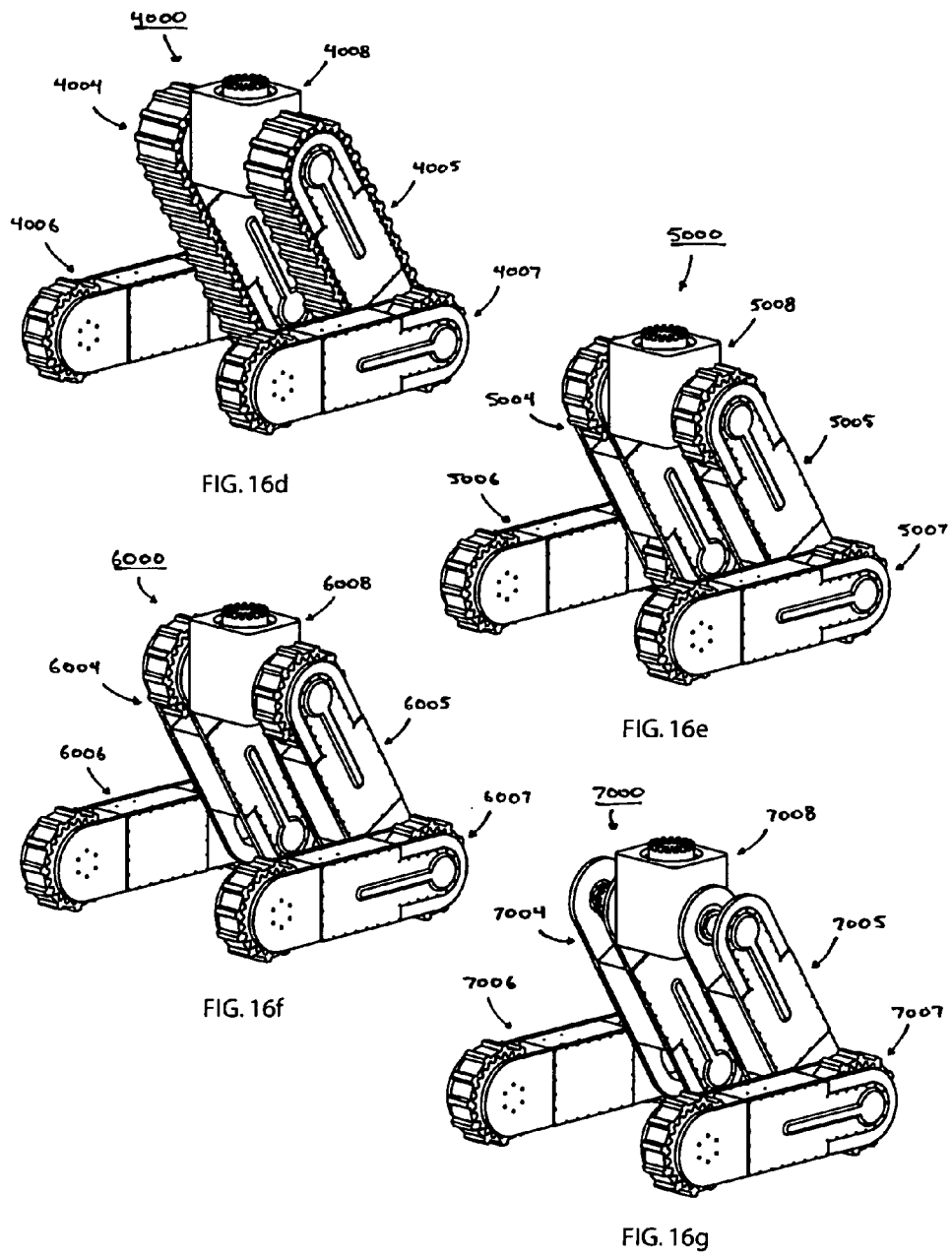
FIG. 16d—An alternative embodiment showing tracked upper legs and wheeled lower legs.
FIG. 16e—An alternative embodiment showing wheeled upper and wheeled lower legs.
FIG. 16f—An alternative embodiment showing wheeled lower legs and partially wheeled upper legs.
FIG. 16g—An alternative embodiment showing wheeled lower legs with an upper leg with no mobility elements.
Figure 16H:
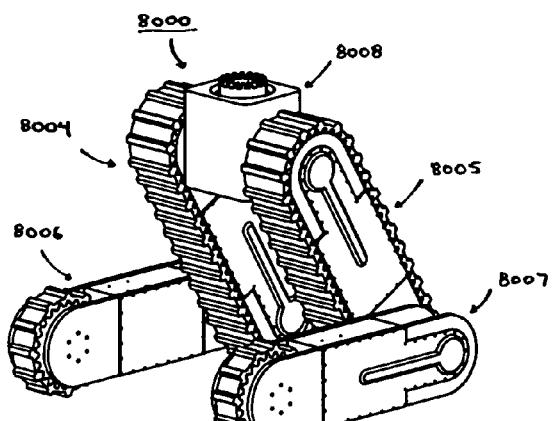
FIG. 16h—An alternative embodiment having a partially wheeled right and left lower leg assembly and a tracked upper right and left leg assembly.
Figure 16I:
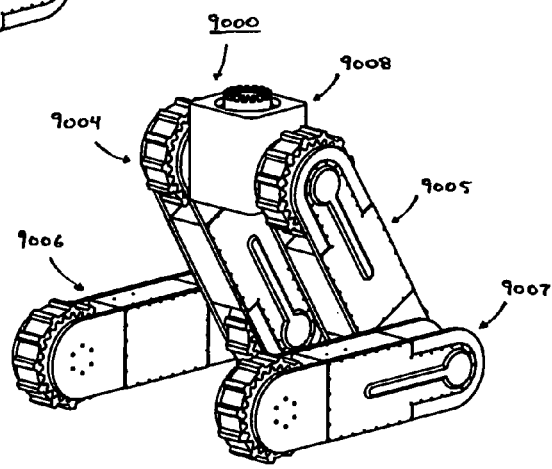
FIG. 16i—An alternative embodiment of a mobility apparatus according to the invention having a partially wheeled lower leg assembly and a wheeled upper leg assembly.
Figure 16J:
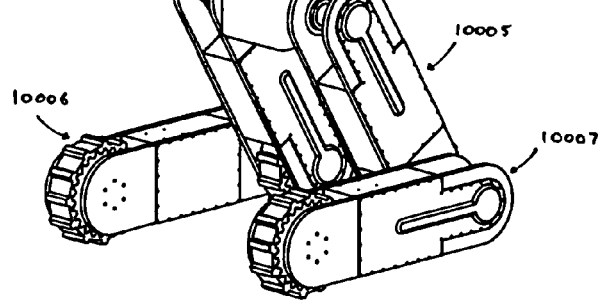
FIG. 16j—An alternative embodiment having a partially wheeled lower leg and a partially wheeled upper leg.

FIGS. 16*a-j*, show alternate embodiments of the mobility platform 1 with different options of mobility elements including tracks and wheels or exclusion thereof on the upper and lower leg segments. FIG. 16*a* depicts the option with lower leg members 1006 and 1007 being tracked and the upper leg members 1004 and 1005 being wheeled. FIG. 16*b* depicts the option with lower leg members 2006 and 2007 being tracked and the upper leg members 2004 and 2005 with wheels only on the proximal end (at the hip). FIG. 16*c* depicts the option with lower leg members 3006 and 3007 being tracked and the upper leg members 3004 and 3005 being passive members without any drive mechanisms. FIG. 16*d* depicts the option with lower leg members 4006 and 4007 being wheeled and the upper leg members 4004 and 4005 being tracked. FIG. 16*e* depicts the option with lower leg members 5006 and 5007 being wheeled and the upper leg members 5004 and 5005 being wheeled. FIG. 16*f* depicts the option with lower leg members 6006 and 6007 being wheeled and the upper leg members 6004 and 6005 with wheels only on the proximal end (at the hip). FIG. 16*g* depicts the option with lower leg members 7006 and 7007 being wheeled and the upper leg members 7004 and 7005 being passive members without any drive mechanisms. FIG. 16*h* depicts the option with lower leg members 8006 and 8007 with wheels only on the distal end and upper leg members 8004 and 8005 being tracked. FIG. 16*i* depicts the option with lower leg members 9006 and 9007 with wheels only on the distal end and upper leg members 9004 and 9005 being wheeled. FIG. 16*j* depicts the option with lower leg members 10006 and 10007 with wheels only on the distal end and upper leg members 10004 and 10005 with wheels only on the distal end (at the knee).

Figure 17A:
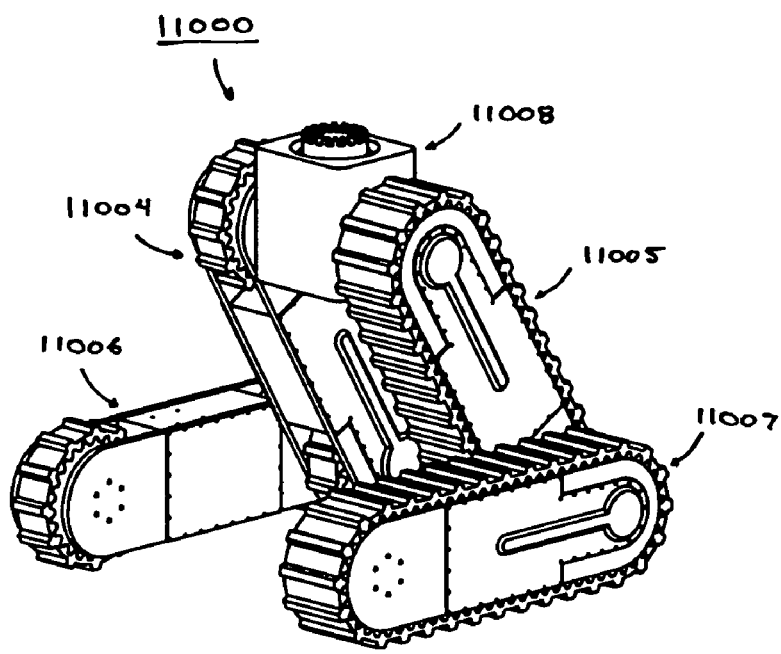
FIG. 17a—Alternative embodiment depicting an asymmetric choice of tracks and wheels showing a right upper and lower wheeled leg, and a left upper and lower tracked leg.
Figure 17B:
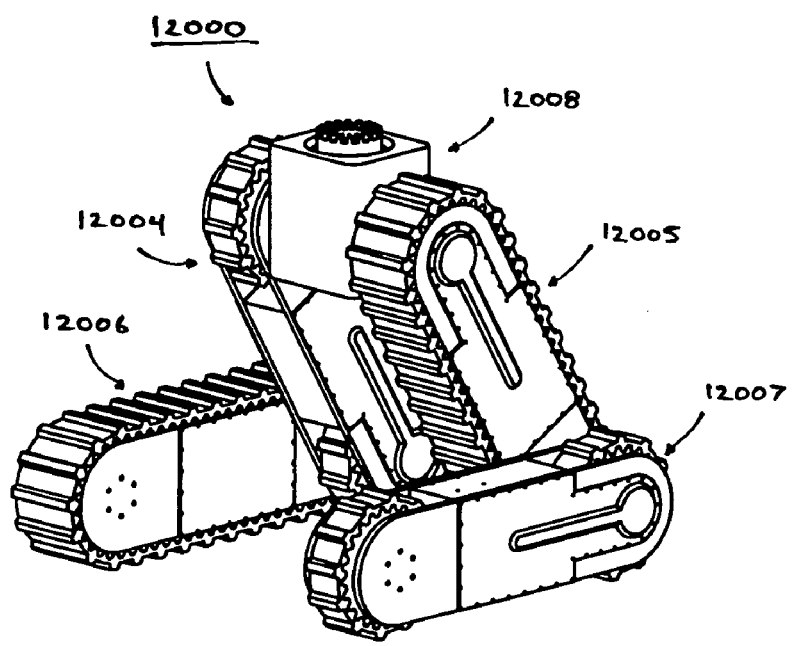
FIG. 17b—An alternative embodiment depicting an asymmetric choice of tracks and wheels showing a right lower tracked leg in combination with a wheeled upper right leg, coupled to a left leg having a tracked upper leg and a wheeled lower leg.
Figure 18:
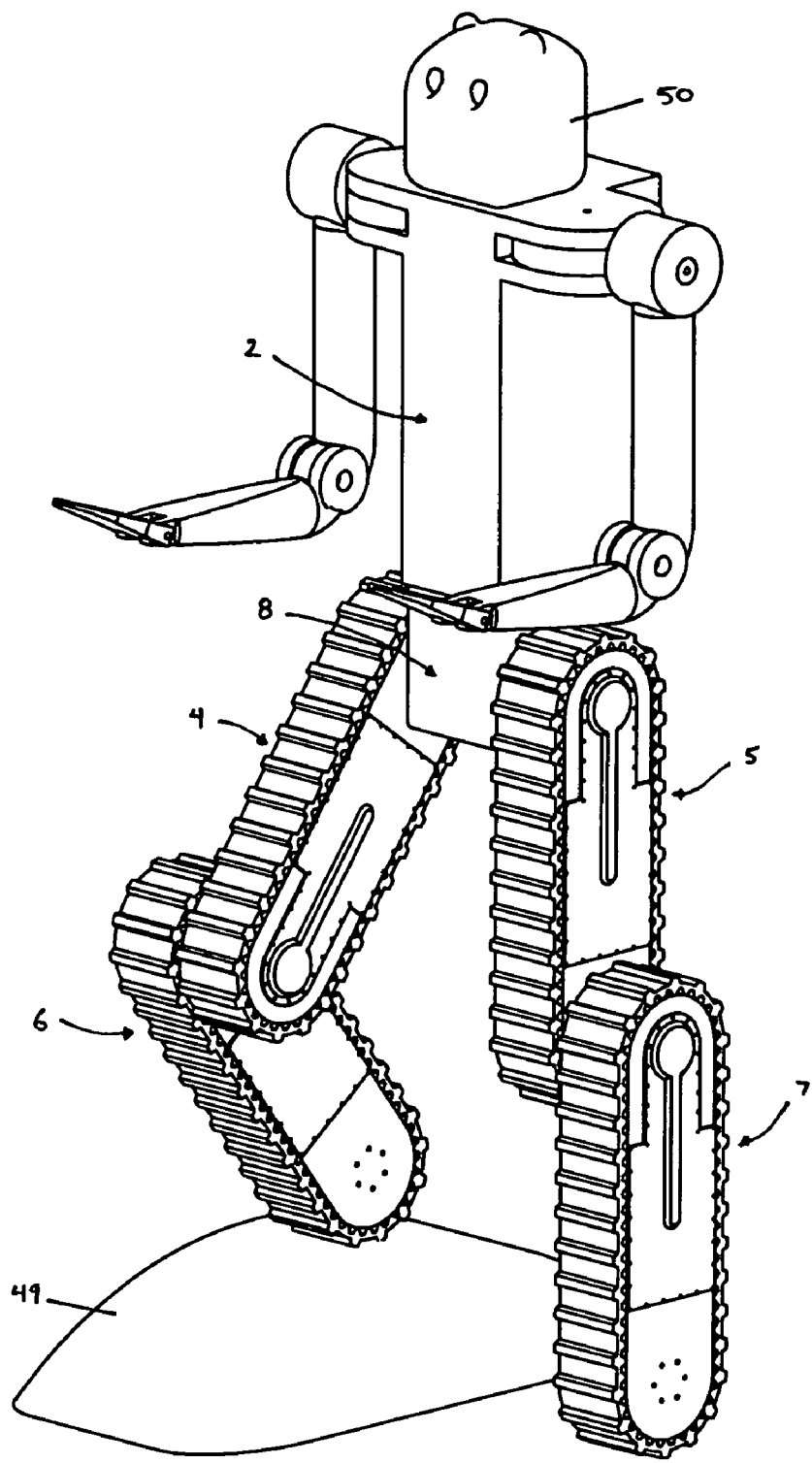
FIG. 18—Is a perspective view of the robot of FIG. 1 in dynamic balancing.
Figure 19:
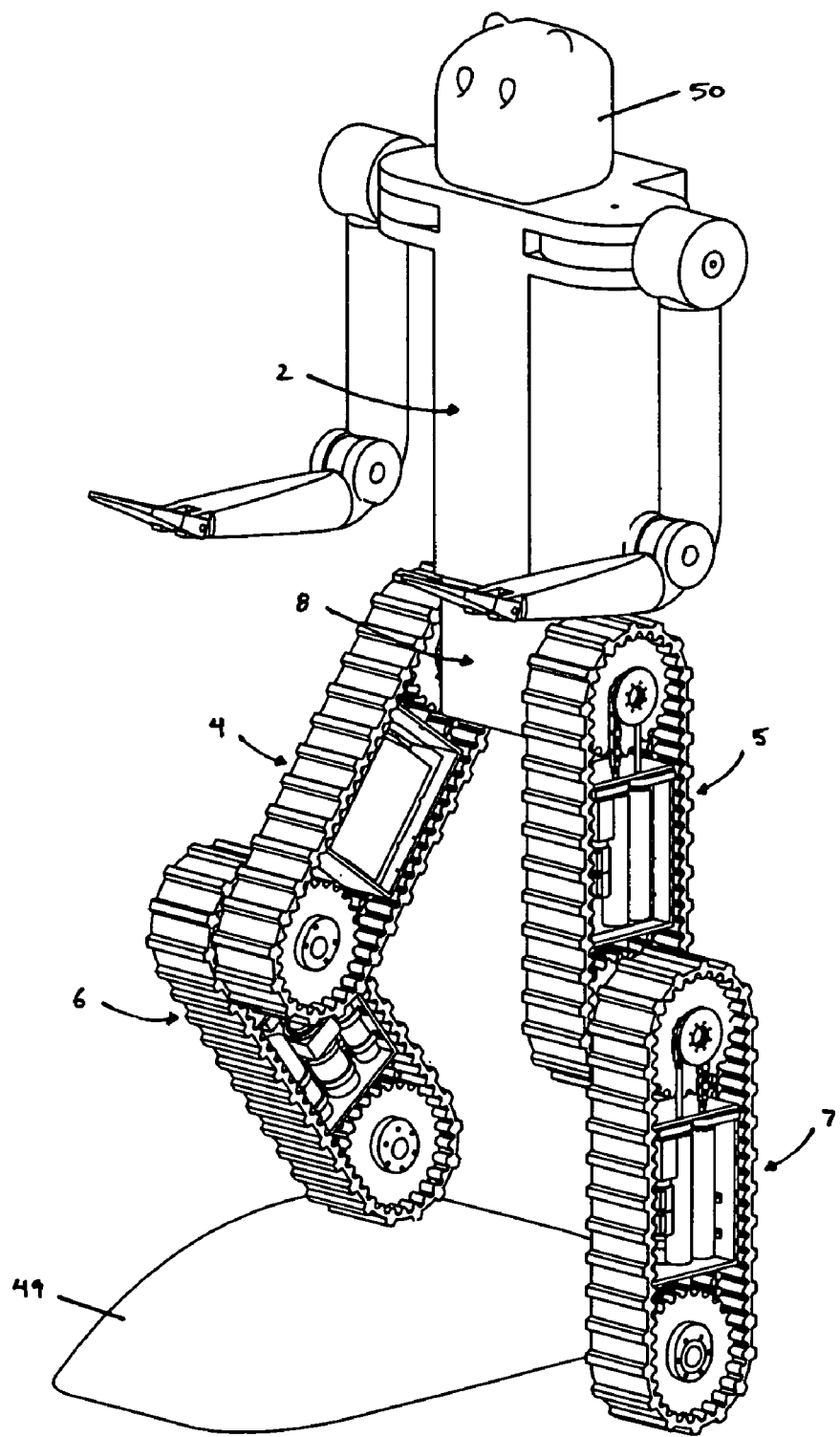
FIG. 19—Is a skeletal perspective view of the robot in FIG. 18 in dynamic balancing.
Figure 20:
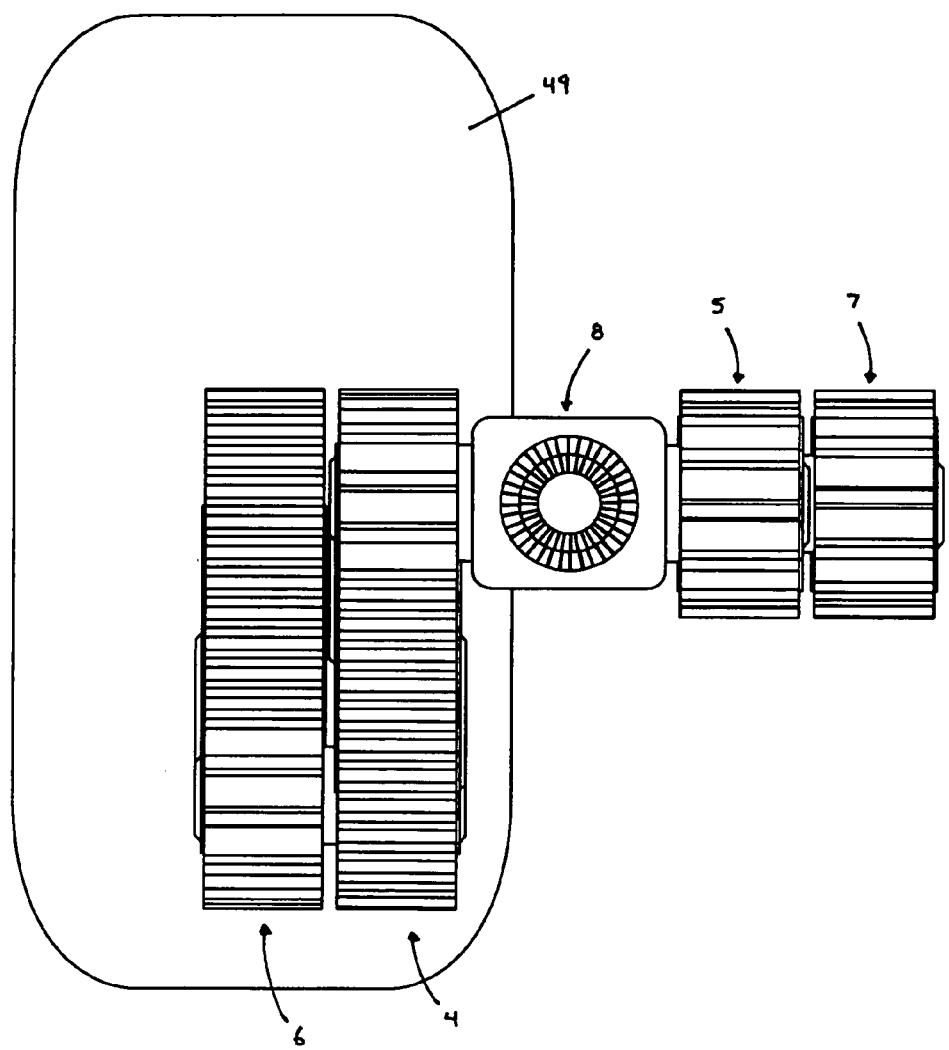
FIG. 20—Is a skeletal top view of mobility platform of FIG. 18 when in dynamic balancing.
Figure 21:
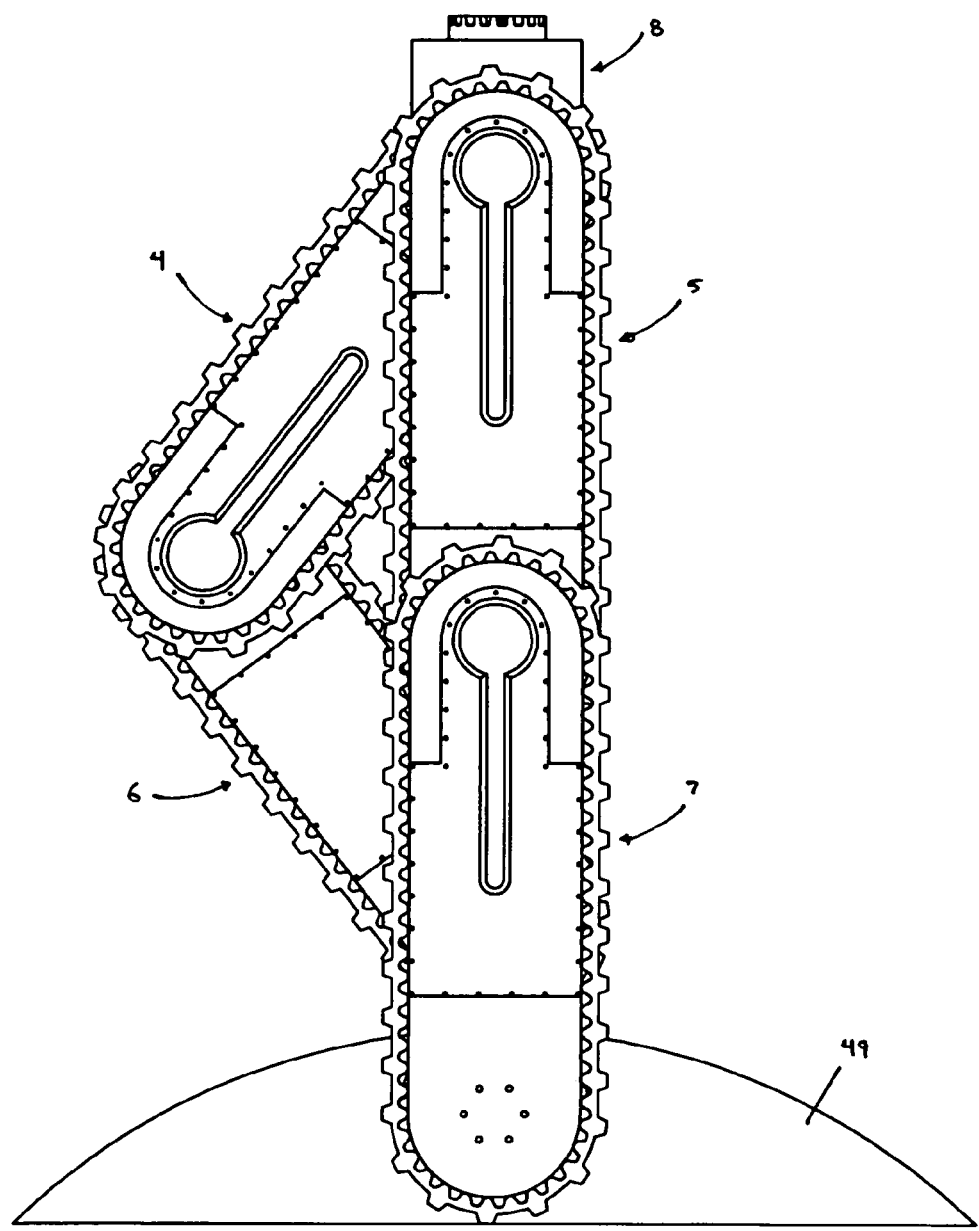
FIG. 21—Is a skeletal side view of the mobility platform of FIG. 18 in dynamic balancing.

FIGS. 17*a-c*, show alternate embodiments of the mobility platform 1 which are asymmetrical pertaining to the use of tracks and wheels on the leg segments.

Referring to FIGS. 18, 19, 20, and 21, the robot 100 is able to maintain a dynamically balanced position with the distal ends of the lower legs 6 and 7 contacting the ground surface, creating an effective area within which the projected center of mass of robot 100 is contained. Having independent legs allows the robot 100 to remain in a stable position with the center of mass equidistant between the left and right side, though the ground surface may not remain completely flat as depicted by the mound 49. If the robot 100 begins to tilt, the legs of the side which is rising (4 and 6 in these figures) adjust their position to keep the center of mass at a stable point.

The robot 100 is also able to dynamically balance on the knee joint and on the hip joint if the ground surface is relatively flat.

Figure 22:
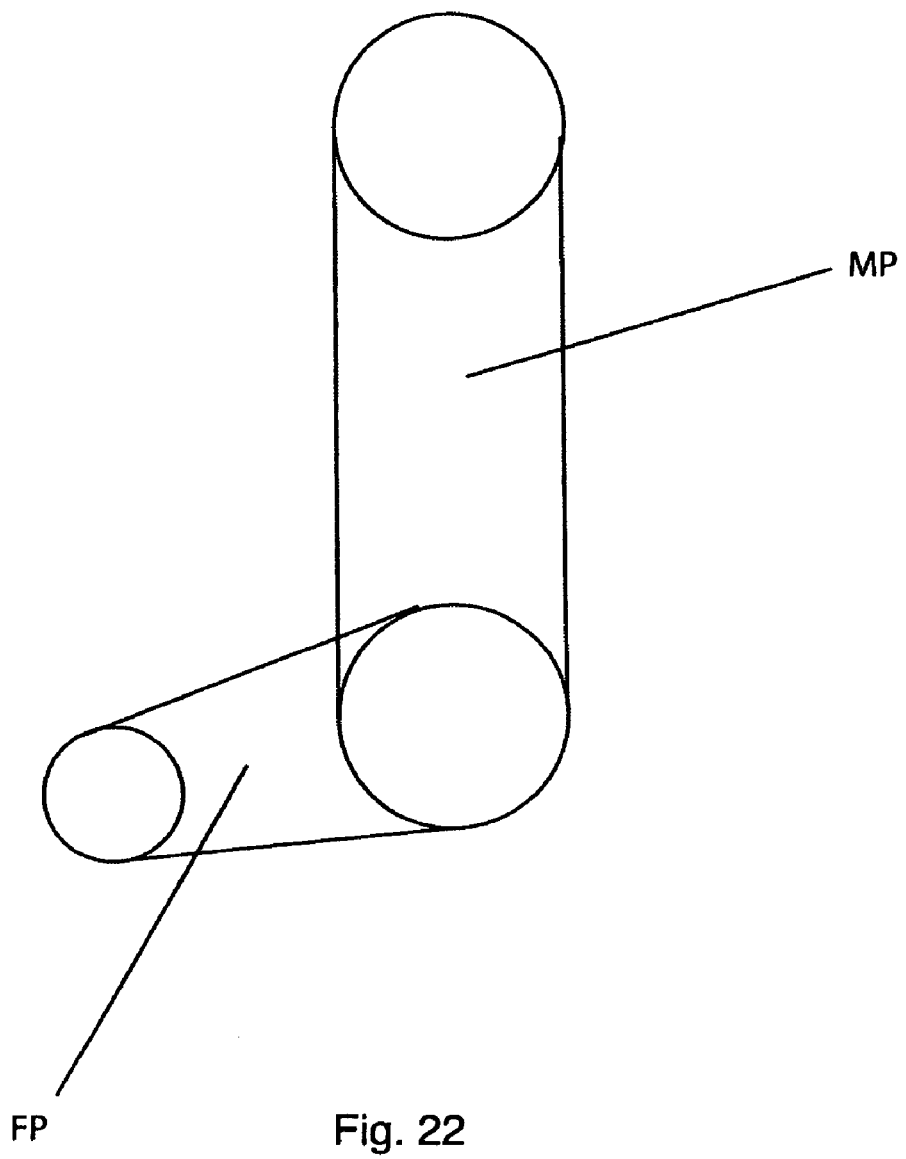
FIG. 22—Prior art of Won U.S. Pat. No. 6,263,989 shows FIG. 8c from that patent
Figures 22A, 22B:
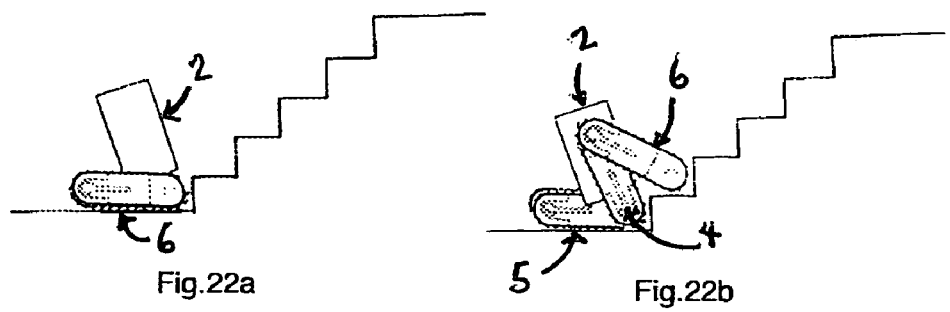
Figures 22C, 22D:
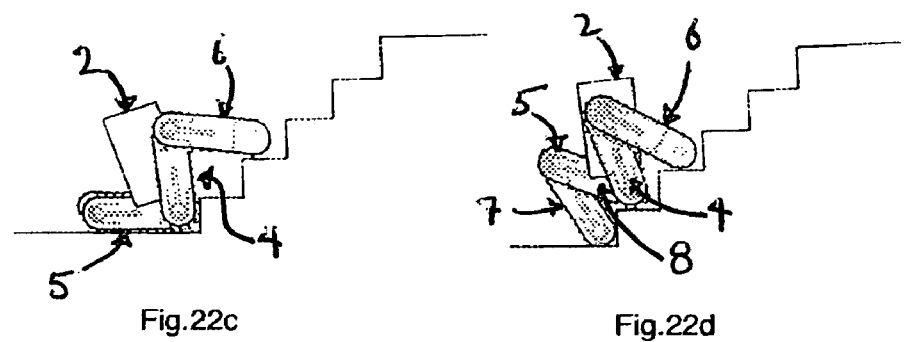
Figures 22E, 22F:
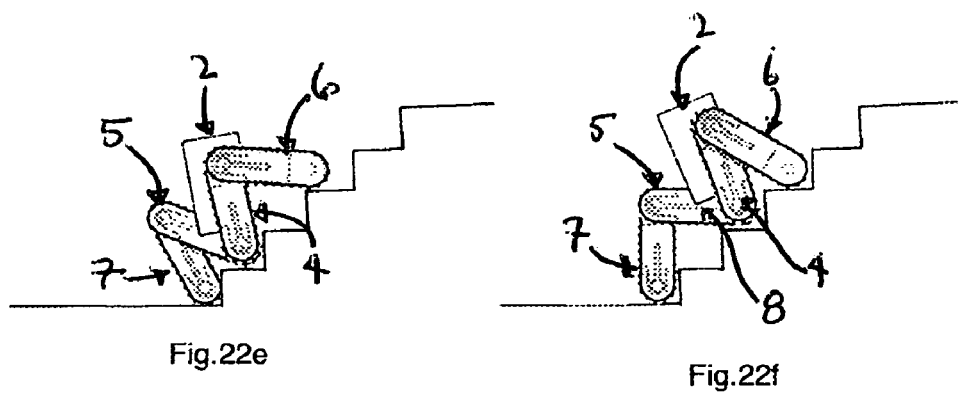
Figure 22G:
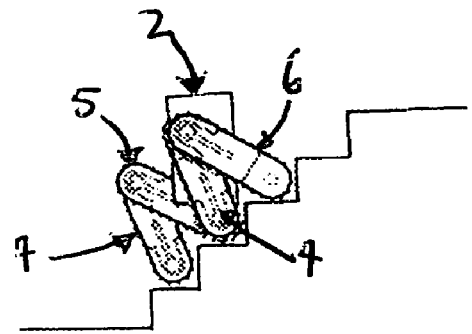
Figure 22H:
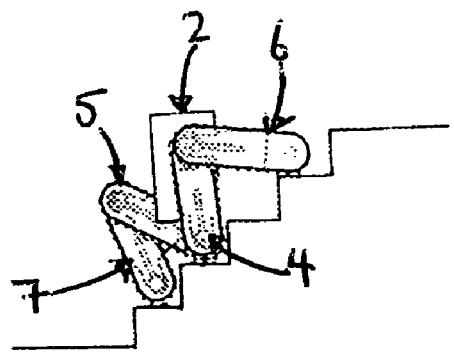
Figure 22I:
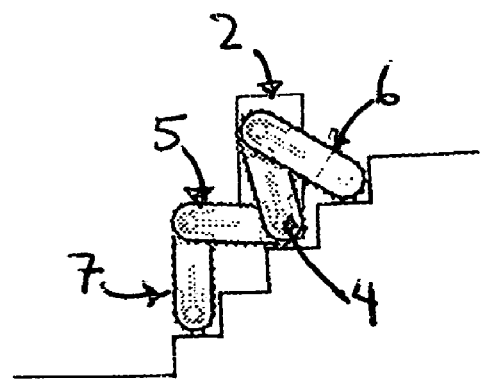
Figure 22J:
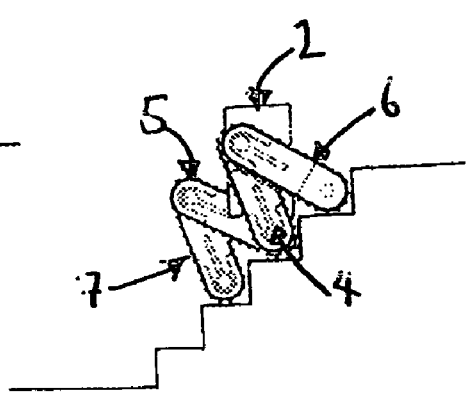
Figure 22K:
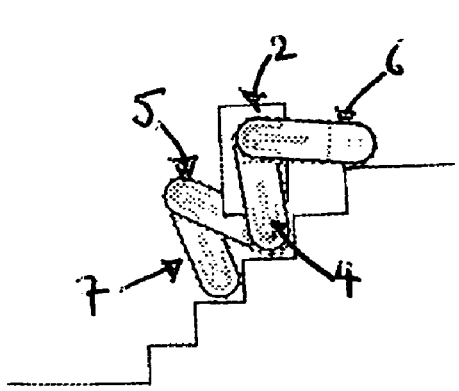
Figure 22L:
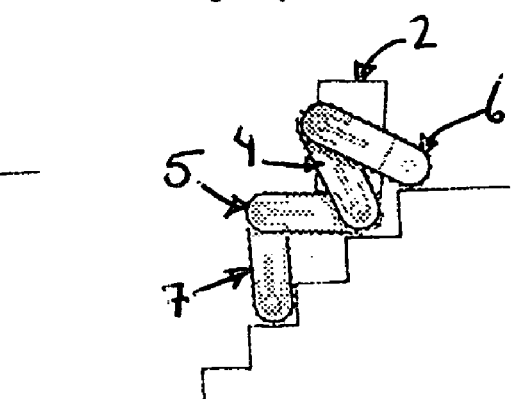
Figure 22M:
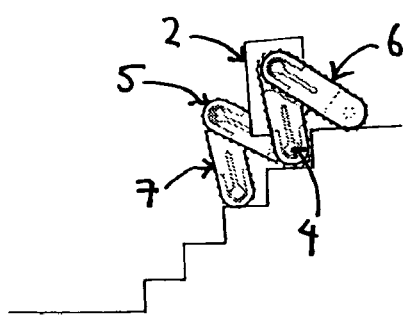
Figure 22N:
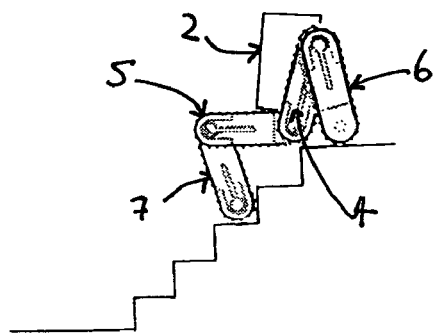
Figure 22O:
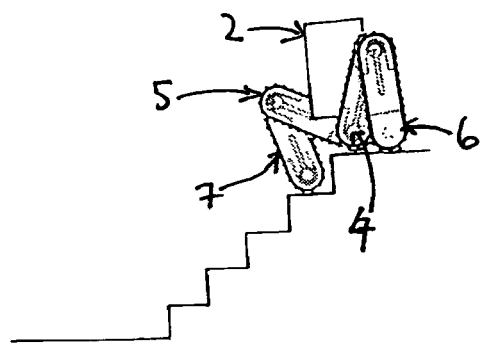
Figure 22P:
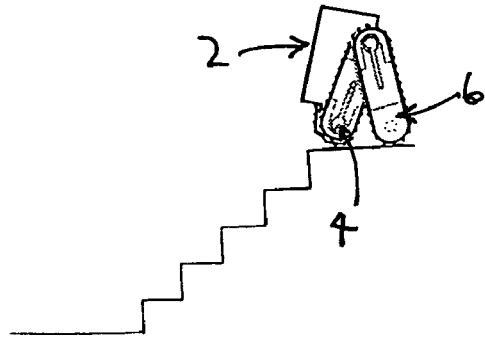

FIGS. 22a-p illustrate the robot 100 in a step climbing maneuver using the 4 leg segments in a "spider-like" climb. FIGS. 22a-g represent the initial stages of this maneuver. In FIG. 22a the robot 100 approaches the steps. In FIG. 22b the right lower leg 6 follows the stairs and the right leg assembly is simultaneously rotated to get the lower right leg 6 onto the first step. In FIG. 22c the lower right leg 6 continues following the stairs and the right leg assembly is rotated to bring the lower right leg 6 to the second step. In FIG. 22d the upper right leg 4 and upper left leg 5 follow the stairs and the right leg assembly is rotated back to the position in FIG. 22b while simultaneously rotating the left leg assembly so that the payload base hip section 8 is on the first step. From this position the right leg repeats the move from FIG. 22b to FIG. 22c to get the lower right leg 6 to the third step in FIG. 22e. In FIG. 22f the upper legs follow the stairs rotating the right leg assembly back to the position in FIG. 22b while the left leg assembly is rotated to pick the payload base hip section 8 to the second step. Lastly in FIG. 22g the left leg segments are rotated back to their position in FIG. 22d so that the lower left leg 7 is on the second step. The steps described in FIGS. 22e-g are repeated in FIGS. 22h-j and again in FIGS. 22k-m as the robot 100 continues to climb the stairs. Upon the right lower leg 6 reaching the top of the stairs the upper legs follow the final step rotating the left and right leg assemblies to bring the payload base hip section 8 to the landing in FIG. 22n. In FIG. 22o the lower left leg 7 follows the last stairs and the left leg assembly rotates to bring the lower left leg 7 to the last step. Finally in FIG. 22p the lower left leg 7 follows the last step and the left leg assembly rotates the lower left leg 7 up to the landing and back into the "knees up sitting position". Throughout the maneuver the projection of the center of mass is contained in the effective area defined by the contact points of the robot.

Figure 23A:
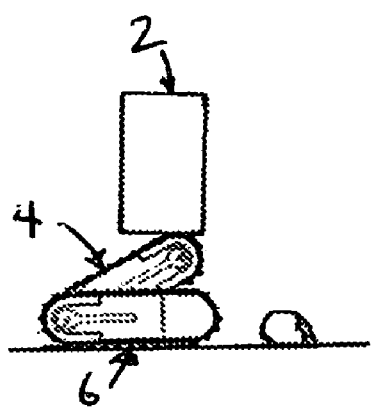
FIG. 23(a-f)—Provides a series of schematic side views of small obstacle avoidance.
Figure 23B:
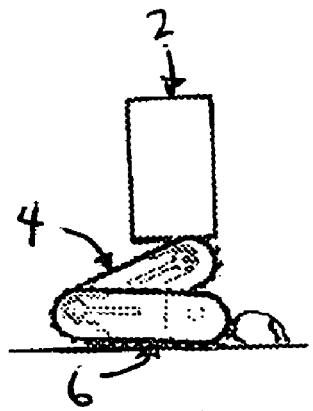
Figure 23C:
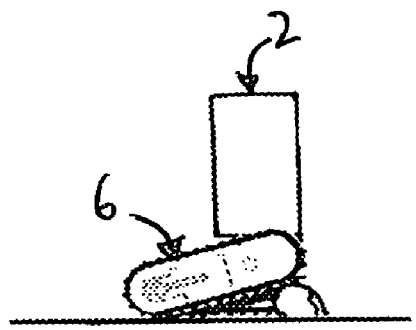
Figure 23D:
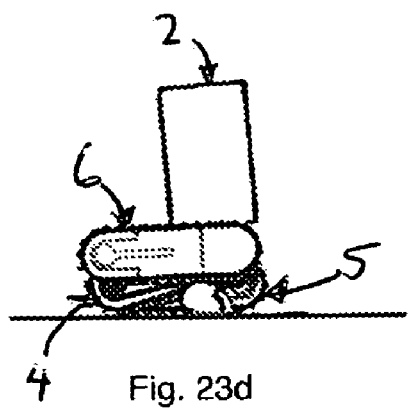
Figure 23E:
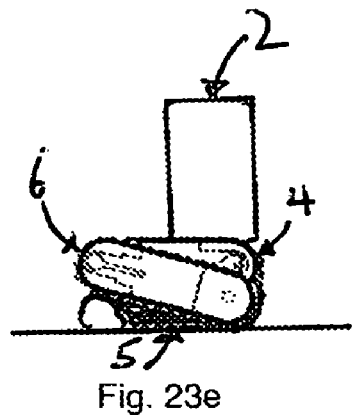
Figure 23F:
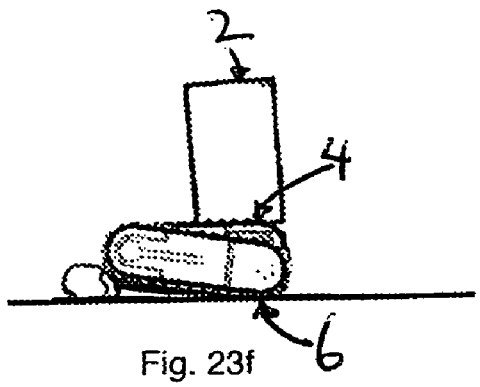

FIGS. 23a-f illustrate the robot 100 overcoming a small obstacle which is in the path of the right leg while driving in the "normal position". Upon making first contact with the object in FIG. 23b the lower right leg 6 rotates up as it is driving to get the distal end of the leg over the object in FIG. 23c. In FIG. 23d the upper right leg 4 rotates up as the leg drives over the object. In FIG. 23e the lower right leg 6 rotates back down after it has driven at least half over though not fully over the object so that the distal end of the lower right leg 6 contacts the ground again. After the leg has overcome the obstacle the upper right leg 4 rotates back down to the ground bringing the robot 100 back to the "normal position" in FIG. 23f.

Figure 24A:
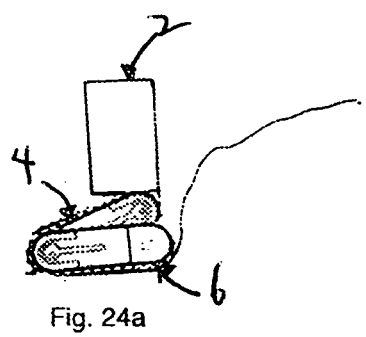
FIG. 24(a-h)—Provides a series of schematic side views of climbing a large obstacle.
Figure 24B:
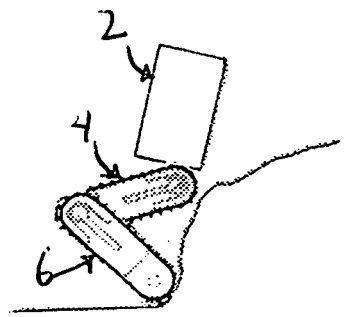
Figure 24C:
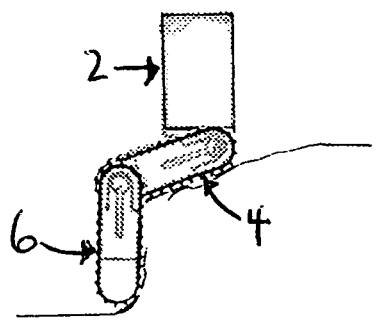
Figure 24D:
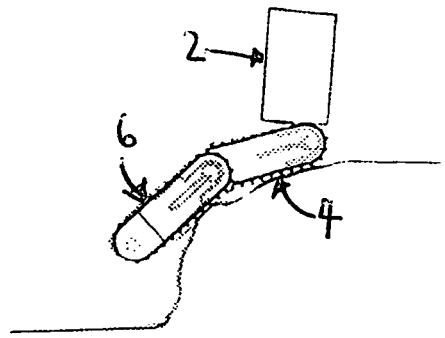
Figure 24E:
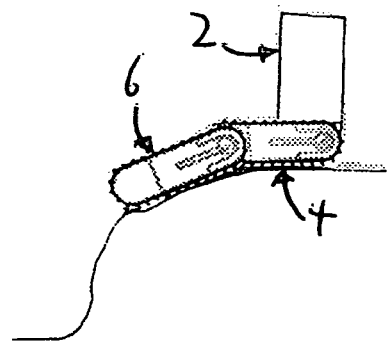
Figure 24F:
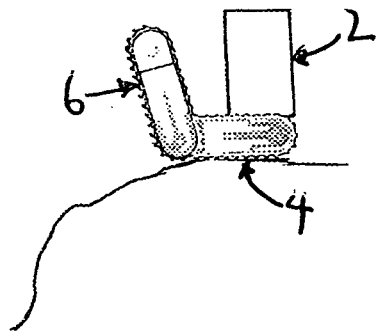
Figures 24G, 24H:
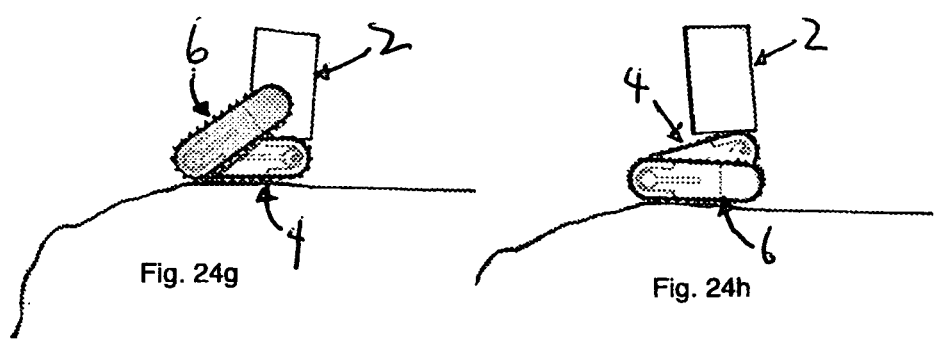

FIGS. 24a-h illustrate the robot 100 overcoming a large obstacle which is in its path, starting from the "normal position". In FIG. 24a the robot 100 approaches the obstacle and the momentum of the forward motion along with rotating both leg assemblies at the upper leg axis brings the proximal ends of the upper legs 4 and 5 in contact with the obstacle. In FIG. 24b the upper legs continue to drive forward up the obstacle as the lower legs 6 and 7 rotate the leg assemblies up the obstacle. In FIG. 24c the lower legs 6 and 7 rotate to make contact with the obstacle. In FIG. 24d both the lower and upper legs drive over the edge of the obstacle to FIG. 24e where they have reached the top. In FIGS. 24f-h the lower legs 6 and 7 rotate 360 degrees from their initial position in FIG. 24a to bring the robot 100 back into the "normal position". During FIGS. 24b-e of the maneuver, the center of mass stays forward of the contact point of the distal end of the lower leg 6.

Figure 25A:
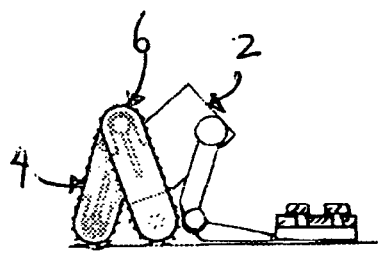
FIG. 25(a-f) Provides a series of schematic side views of lifting a load.
Figure 25B:
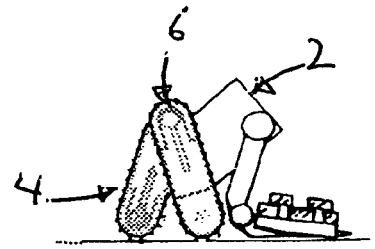
Figure 25C:
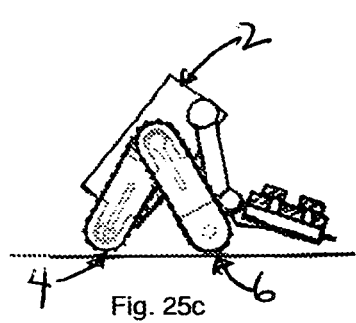
Figure 25D:
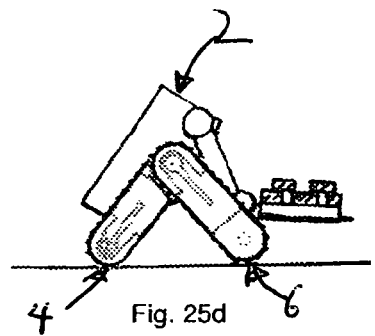
Figure 25E:
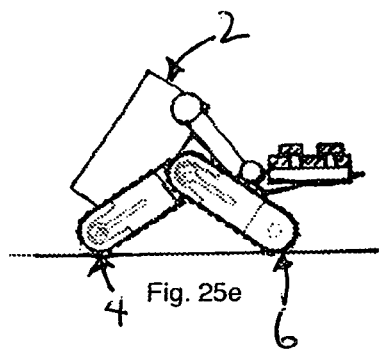
Figure 25F:
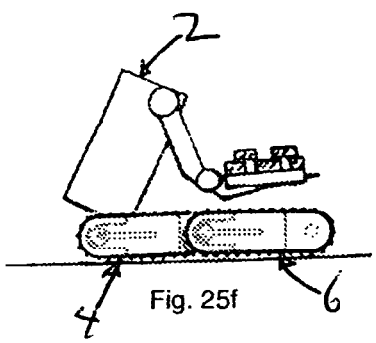
Figure 26A:
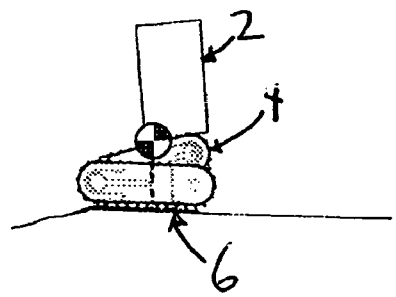
FIG. 26(a-f)—Provides a series of schematic side views of going into a dynamically balanced standing position.
Figure 26B:
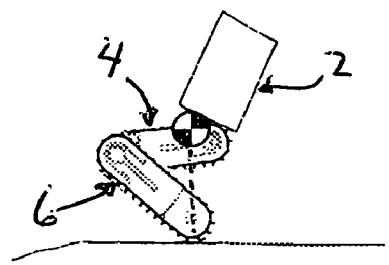
Figure 26C:
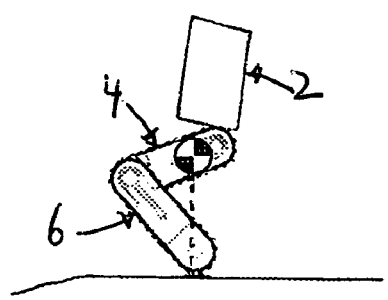
Figure 26D:
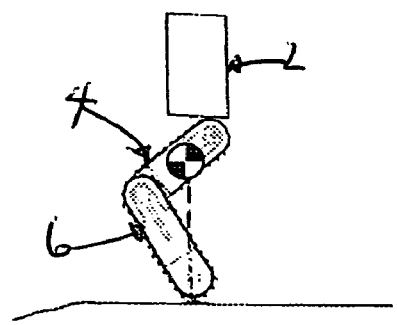
Figure 26E:
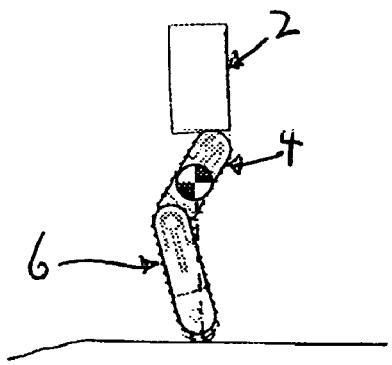
Figure 26F:
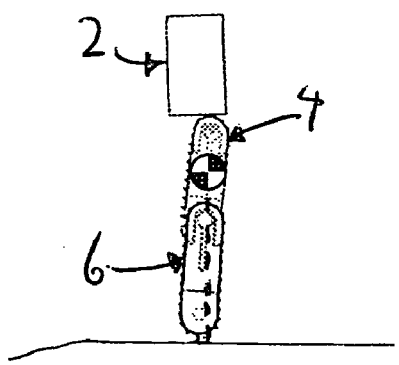

FIGS. 25a-f illustrate the robot 100 picking up a load. Starting in FIG. 25a the robot approaches the load in the "knees up sitting position". The arms of the torso slide under the load in FIG. 25b. In FIGS. 25c-f the leg assemblies rotate out as the torso picks up the load keeping the center of mass between the contact points of the proximal ends of the upper legs 4 and 5 and the distal ends of the lower legs 6 and 7. In FIG. 25f the robot 100 reaches the "sitting position" and is ready to transport the load.

FIGS. 26a-f illustrate the robot 100 going from the "normal position" to a dynamically balanced standing position. The objective in this maneuver is to keep the center of mass above the ground contact center of pressure. As the robot 100 leans forward in FIG. 26b the dynamic balancing control system controls the lower leg mobility element drive systems to keep the center of mass above the ground contact center of pressure. The control system continues to dynamically update the gain matrix based on the orientation of the upper and lower legs and torso 2 as the leg assemblies rotate the system up. At any point the rotation of the legs could stop and the robot 100 will continue to remain dynamically balanced. The rotation of the legs is a disturbance to the control system and with slow enough rotation, and thus minimal disturbance, the control system will maintain dynamic balancing. Eventually the robot 100 reaches the "upright position" in FIG. 26f.

Figures 27A, 27B:
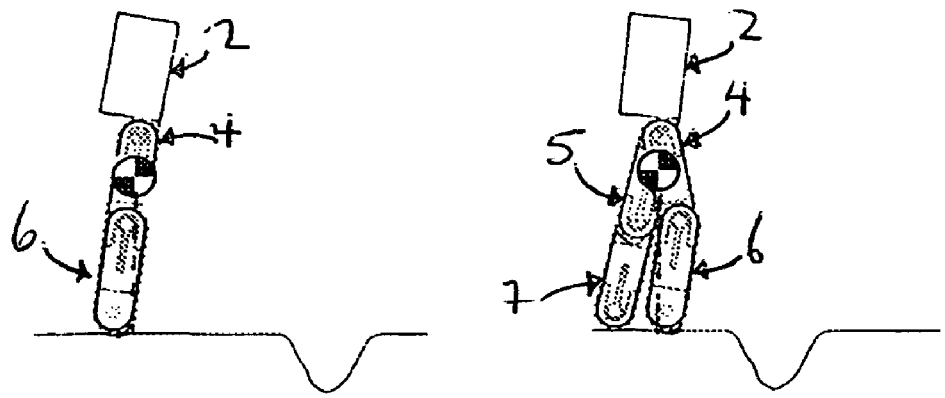
FIG. 27(a-f)—Provides a series of schematic side views of stepping over a ditch while dynamically balancing.
Figures 27C, 27D:
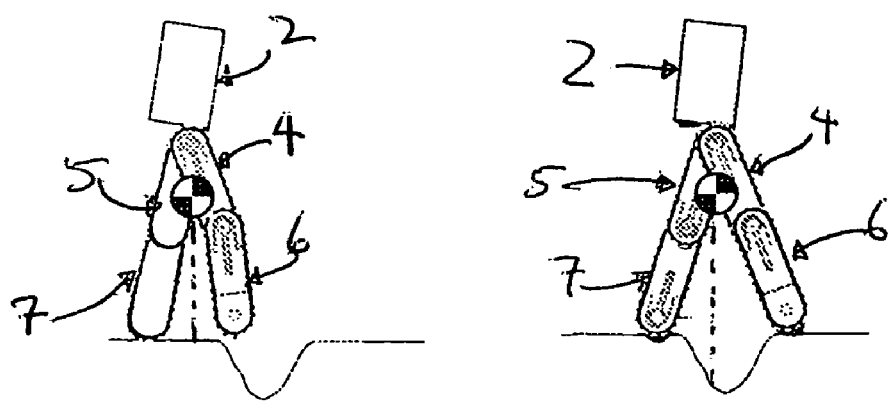
Figures 27E, 27F:
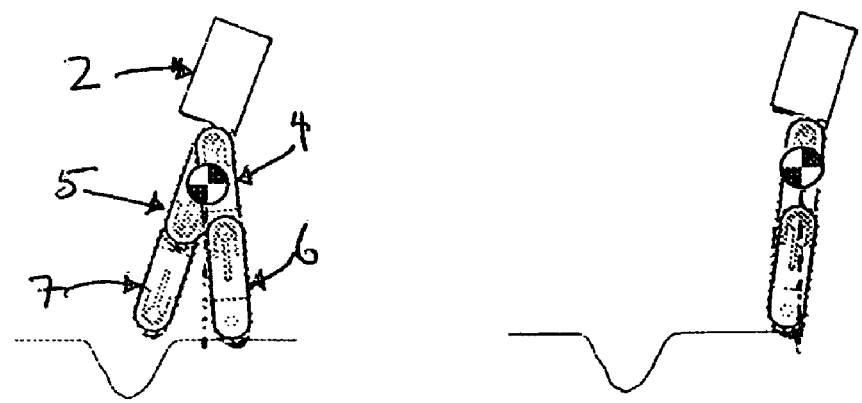

FIGS. 27a-f illustrate the robot 100 dynamically stepping over a ditch while driving in an upright dynamically balanced position. The entire maneuver is done quickly enough to keep the robot 100 from losing the ability to maintain lateral stability. FIG. 27a shows the robot 100 accelerating forward where the projection of the center of mass on the ground plane is slightly forward of the ground contact center of pressure. In FIG. 27b the robot 100 reaches constant velocity moving the right leg forward as it approaches the ditch. In FIG. 27c the right leg assembly is rotated up which causes the robot 100 to begin to fall forward and tilt to the right. The right leg is lifted enough so that the right leg makes it over the ditch but not to high so that contact with the other side is achieved as seen in FIG. 27d before the left leg has reached the ditch. At this point, in FIG. 27e, the left leg is lifted causing the robot to fall backwards and to the left. Again the left leg is lifted enough to make contact with the other side of the ditch before the robot has tilted too far to the left. The left leg assembly makes contact with the right side of the ditch and restores the projected center of mass to a stable location between the contact points of the distal end of the lower right leg 6 and lower left leg 7. In FIG. 27f the left leg assembly is rotated to bring the robot 100 back to the "upright position" and the robot 100 begins to accelerate again moving the projected center of mass slightly ahead of the ground contact center of pressure.

Although the present invention has been described above with reference to certain embodiments of the invention, the invention is not limited to the embodiments described above. Variations, alternatives, and modifications will occur to those skilled in the art, in light of the teachings herein. All such variations, alternatives, and modifications are considered a part of the present invention.

What is claimed is:

1. A compact mobile, articulated tracked platform for operation on a surface having a ground plane comprising:

a payload base hip section, said payload base hip section having two substantially parallel opposing sides, a right payload base side and a left payload base side, said payload base hip section further comprising a payload base mounting surface, said payload base mounting surface disposed between said right payload base side and said left payload base side, wherein said payload base mounting surface is disposed substantially orthogonal to said two substantially parallel and opposing payload base hip section sides, said platform including a right leg assembly and a left leg assembly, said each leg assembly comprising an upper leg and a lower leg section, where said right and left leg assemblies each comprise a right and a left upper leg and a right and a left lower leg, said each of said right and left upper legs having a proximal and distal end therefore, said each of said right and left upper legs operating in substantially parallel planes, said right leg being pivotally coupled at said proximal end to said right side of said payload base hip section and said left of said upper legs being pivotally coupled to said left side of said payload base hip section about a transverse axis generally perpendicular to said parallel opposing sides of said payload base hip section, allowing separate and independent rotation of said each of said upper legs about said payload base hip section, said each of said right and left lower legs having a proximal end and a distal end, said each of said right and left lower legs operating in substantially parallel planes, said right lower leg proximal end being independently and pivotally connected to a distal end of said right upper leg, and said left lower leg proximal end being independently and pivotally connected to a distal end of said left upper leg, allowing rotation of said each of said lower legs about said each of said upper legs, said platform for attaching a torso section to said payload base mounting surface;

said each of said leg assemblies further having mobility elements for propelling said platform where said right and left upper legs have right upper leg track and left upper leg track mobility elements coupled to a corresponding one of each of said upper leg sections, said each of said right and left lower legs further having right lower leg track and left lower leg track mobility elements coupled to a corresponding one of each of said lower leg sections, where said platform includes a mobility element drive system for independently, rotationally propelling said each of said tracks about said each of said leg sections in each of a forward and reverse direction, such that said platform can be propelled in a first mode of locomotion driven on at least one of (1) said right and left upper leg tracks, (2) said right and left lower leg tracks, (3) said right and left upper leg tracks and said right and left lower leg tracks, (4) a portion of said right and left upper leg tracks and said right and left lower leg tracks, (5) a portion of said right and left lower leg tracks and said right and left upper leg tracks, (6) a portion of said right and left upper leg tracks and a portion of said right and left lower leg tracks, and (7) at least one of (1) said right upper and right lower leg tracks of said right leg assembly and a portion of said left upper and left lower leg tracks of said left leg assembly, and (2) said left upper and left lower leg tracks of said left leg assembly and a portion of said right upper and right lower leg tracks of said right leg assembly, and a pivot drive system for rotating said each of said lower legs pivotally about said each of said upper legs, and for rotating said each of said upper legs pivotally about said payload base hip section, such that said platform can be propelled in a second mode of locomotion driven by (1) the rotation of said right lower leg about said right upper leg, and the rotation of said right upper leg about said rightside of said payload base hip and (2) the rotation of said left lower leg about said left upper leg, and the rotation said left upper leg about said left side of said payload base hip.

2. The platform of claim 1 wherein said platform has a center of mass and a vertical projection therefore, and where said platform comprises a dynamic balancing drive interface and control system for enabling the dynamic stability of said platform when moving from at least a first position where said platform is static and at rest to a second dynamically balanced position in which said each upper leg is rotated into a parallel coplanar position with said each lower leg such that solely said each lower leg section has a contact point with said ground plane at a position defined by a line substantially orthogonal to a tangent drawn at said sole point where lower tracks of said lower legs are in contact with said ground plane, where said payload base hip section is held in at least a position in which said vertical projection of said center of gravity of said platform is substantially co-located over said contact point with said ground.

3. A compact mobile, articulated tracked platform for operation on a surface having a ground plane comprising:

a payload base hip section, said payload base hip section having two substantially parallel opposing sides, a right payload base side and a left payload base side, said payload base hip section further comprising a payload base mounting surface, said payload base mounting surface disposed between said right payload base side and said left payload base side, wherein said payload base mounting surface is disposed substantially orthogonal to said two substantially parallel and opposing payload base hip section sides, said platform including a right leg assembly and a left leg assembly, said each leg assembly comprising an upper leg and a lower leg section, where said right and left leg assemblies each comprise a right and a left upper leg and a right and a left lower leg, said each of said right and left upper legs having a proximal and distal end therefore, said each of said right and left upper legs operating in substantially parallel planes, said right leg being pivotally coupled at said proximal end to said right side of said payload base hip section and said left of said upper legs being pivotally coupled to said left side of said payload base hip section about a transverse axis generally perpendicular to said parallel opposing sides of said payload base hip section, allowing separate and independent rotation of said each of said upper legs about said payload base hip section, said each of said right and left lower legs having a proximal end and a distal end, said each of said right and left lower legs operating in substantially parallel planes, said right lower leg proximal end being independently and pivotally connected to a distal end of said right upper leg, and said left lower leg proximal end being independently and pivotally connected to a distal end of said left upper leg, allowing rotation of said each of said lower legs about said each of said upper legs, said platform for attaching a torso section to said payload base mounting surface;

said each of said leg assemblies further having mobility elements for propelling said platform on at least said right and left lower legs, wherein said each of said right and left lower legs have right lower leg track and left lower leg track mobility elements coupled to a corresponding one of each of said lower leg sections, where said platform includes a mobility element drive system for independently, rotationally propelling said each of said tracks about said each of said leg sections in each of a forward and reverse direction, such that said platform can be propelled in a first mode of locomotion driven on at least said right and left lower leg tracks, and a pivot drive system for rotating said each of said lower legs pivotally about said each of said upper legs, and for rotating said each of said upper legs pivotally about said payload base hip section, such that said platform can be propelled in a second mode of locomotion driven by (1) the rotation of said right lower leg about said right upper leg, and the rotation of said right upper leg about said rightside of said payload base hip and (2) the rotation of said left lower leg about said left upper leg, and the rotation said left upper leg about said left side of said payload base hip.

4. The platform of claim 3 wherein said platform has a center of mass and a vertical projection therefore, and where said platform comprises a dynamic balancing drive interface and control system for enabling the dynamic stability of said platform when moving from at least a first position where said platform is static and at rest to a second dynamically balanced position in which said each upper leg is rotated into a parallel coplanar position with said each lower leg such that solely said each lower leg section has a contact point with said ground plane at a position defined by a line substantially orthogonal to a tangent drawn at said sole point where lower tracks of said lower legs are in contact with said ground plane, where said payload base hip section is held in at least a position in which said vertical projection of said center of gravity of said platform is substantially co-located over said contact point with said ground.

5. A compact mobile, articulated tracked platform for operation on a surface having a ground plane comprising:

a payload base hip section, said payload base hip section having two substantially parallel opposing sides, a right payload base side and a left payload base side, said payload base hip section further comprising a payload base mounting surface, said payload base mounting surface disposed between said right payload base side and said left payload base side, wherein said payload base mounting surface is disposed substantially orthogonal to said two substantially parallel and opposing payload base hip section sides, said platform including a right leg assembly and a left leg assembly, said each leg assembly comprising an upper leg and a lower leg section, where said right and left leg assemblies each comprise a right and a left upper leg and a right and a left lower leg, said each of said right and left upper legs having a proximal and distal end therefore, said each of said right and left upper legs operating in substantially parallel planes, said right leg being pivotally coupled at said proximal end to said right side of said payload base hip section and said left of said upper legs being pivotally coupled to said left side of said payload base hip section about a transverse axis generally perpendicular to said parallel opposing sides of said payload base hip section, allowing separate and independent rotation of said each of said upper legs about said payload base hip section, said each of said right and left lower legs having a proximal end and a distal end, said each of said right and left lower legs operating in substantially parallel planes, said right lower leg proximal end being independently and pivotally connected to a distal end of said right upper leg, and said left lower leg proximal end being independently and pivotally connected to a distal end of said left upper leg, allowing rotation of said each of said lower legs about said each of said upper legs, said platform for attaching a torso section to said payload base mounting surface;

said each of said leg assemblies further having mobility elements for propelling said platform where at least said each of said right and left lower legs have wheel mobility elements pivotally coupled to a corresponding one of each of said proximal and distal ends of said lower leg sections, where said platform includes a mobility element drive system for independently, rotationally propelling at least said each of wheels about said each of said leg sections in each of a forward and reverse direction, such that said platform can be propelled in a first mode of locomotion driven on at least said wheels on said lower leg sections, and a pivot drive system for rotating said each of said lower legs pivotally about said each of said upper legs, and for rotating said each of said upper legs pivotally about said payload base hip section, such that said platform can be propelled in a second mode of locomotion driven by (1) the rotation of said right lower leg about said right upper leg, and the rotation of said right upper leg about said rightside of said payload base hip and (2) the rotation of said left lower leg about said left upper leg, and the rotation said left upper leg about said left side of said payload base hip.

6. The platform of claim 5 wherein said platform has a center of mass and a vertical projection therefore, and where said platform comprises a dynamic balancing drive interface and control system for enabling the dynamic stability of said platform when moving from at least a first position where said platform is static and at rest to a second dynamically balanced position in which said each upper leg is rotated into a parallel coplanar position with said each lower leg such that solely said each lower leg section has a contact point with said ground plane at a position defined by a line substantially orthogonal to a tangent drawn at said sole point where said lower wheels on said distal end of lower legs are in contact with said ground plane, where said payload base hip section is held in at least a position in which said vertical projection of said center of gravity of said platform is substantially co-located over said contact point with said ground.

7. A compact mobile, articulated tracked robot platform for operation on a surface having a ground plane comprising:

a combination of a payload base hip section and a torso section, said payload base hip section having two substantially parallel opposing sides, a right payload base side and a left payload base side, said payload base hip section further comprising a payload base mounting surface, said payload base mounting surface disposed between said right payload base side and said left payload base side, wherein said payload base mounting surface is disposed substantially orthogonal to said two substantially parallel and opposing payload base hip section sides, said platform including a right leg assembly and a left leg assembly, said each leg assembly comprising an upper leg and a lower leg section, where said right and left leg assemblies each comprise a right and a left upper leg and a right and a left lower leg, said each of said right and left upper legs having a proximal and distal end therefore, said each of said right and left upper legs operating in substantially parallel planes, said right leg being pivotally coupled at said proximal end to said right side of said payload base hip section and said left of said upper legs being pivotally coupled to said left side of said payload base hip section about a transverse axis generally perpendicular to said parallel opposing sides of said payload base hip section, allowing separate and independent rotation of said each of said upper legs about said payload base hip section, said each of said right and left lower legs having a proximal end and a distal end, said each of said right and left lower legs operating in substantially parallel planes, said right lower leg proximal end being independently and pivotally connected to a distal end of said right upper leg, and said left lower leg proximal end being independently and pivotally connected to a distal end of said left upper leg, allowing rotation of said each of said lower legs about said each of said upper legs, said torso section comprising at least a mounting post for attaching said torso at said said payload base mounting surface, said torso section further comprising right and left arm assemblies for scooping up and supporting a payload;

said each of said leg assemblies further having mobility elements for propelling said platform where said right and left upper legs have right upper leg track and left upper leg track mobility elements coupled to a corresponding one of each of said upper leg sections, said each of said right and left lower legs further having right lower leg track and left lower leg track mobility elements coupled to a corresponding one of each of said lower leg sections, where said platform includes a mobility element drive system for independently, rotationally propelling said each of said tracks about said each of said leg sections in each of a forward and reverse direction, such that said platform can be propelled in a first mode of locomotion driven on at least one of (1) said right and left upper leg tracks, (2) said right and left lower leg tracks, (3) said right and left upper leg tracks and said right and left lower leg tracks, (4) a portion of said right and left upper leg tracks and said right and left lower leg tracks, (5) a portion of said right and left lower leg tracks and said right and left upper leg tracks, (6) a portion of said right and left upper leg tracks and a portion of said right and left lower leg tracks, and (7) at least one of (1) said right upper and right lower leg tracks of said right leg assembly and a portion of said left upper and left lower leg tracks of said left leg assembly, and (2) said left upper and left lower leg tracks of said left leg assembly and a portion of said right upper and right lower leg tracks of said right leg assembly, and a pivot drive system for rotating said each of said lower legs pivotally about said each of said upper legs, and for rotating said each of said upper legs pivotally about said payload base hip section, such that said platform can be propelled in a second mode of locomotion driven by (1) the rotation of said right lower leg about said right upper leg, and the rotation of said right upper leg about said rightside of said payload base hip and (2) the rotation of said left lower leg about said left upper leg, and the rotation said left upper leg about said left side of said payload base hip.

8. A method for operating an articulated tracked mobile platform having at least a payload base hip section, said payload base hip section having two substantially parallel opposing sides, a right payload base side and a left payload base side, said payload base hip section further comprising a payload base mounting surface, said payload base mounting surface disposed between said right payload base side and said left payload base side, wherein said payload base mounting surface is disposed substantially orthogonal to said two substantially parallel and opposing payload base hip section sides, said platform including a right leg assembly and a left leg assembly, said each leg assembly comprising an upper leg and a lower leg section, where said right and left leg assemblies each comprise a right and a left upper leg and a right and a left lower leg, said each of said right and left upper legs having a proximal and distal end therefore, said each of said right and left upper legs operating in substantially parallel planes, said right leg being pivotally coupled at said proximal end to said right side of said payload base hip section and said left of said upper legs being pivotally coupled to said left side of said payload base hip section about a transverse axis generally perpendicular to said parallel opposing sides of said payload base hip section, allowing separate and independent rotation of said each of said upper legs about said payload base hip section, said each of said right and left lower legs having a proximal end and a distal end, said each of said right and left lower legs operating in substantially parallel planes, said right lower leg proximal end being independently and pivotally connected to a distal end of said right upper leg, and said left lower leg proximal end being independently and pivotally connected to a distal end of said left upper leg, allowing rotation of said each of said lower legs about said each of said upper legs, said platform for attaching a torso section to said payload base mounting surface;

said each of said leg assemblies further having mobility elements for propelling said platform where said right and left upper legs have right upper leg track and left upper leg track mobility elements coupled to a corresponding one of each of said upper leg sections, said each of said right and left lower legs further having right lower leg track and left lower leg track mobility elements coupled to a corresponding one of each of said lower leg sections, where said platform includes a mobility element drive system for independently, rotationally propelling said each of said tracks about said each of said leg sections in each of a forward and reverse direction, and a pivot drive system for rotating said each of said lower legs pivotally about said each of said upper legs, and for rotating said each of said upper legs pivotally about said payload base hip section, said platform having a center of gravity and a vertical projection of said center of gravity toward ground, said platform further having a projected stability area defined by the perimeter of points of the contact points of the mobility elements when articulated in extension to their most distal positions with respect to the payload base hip section where the perimeter is formed by a set of intersecting lines which are orthogonal to each of the tangent points of each of the distal contact points, said method to climb a series of stairs, with said stairs having a rise in elevation at a first stair and at each subsequent stair including a second higher stair, and a third higher stair, said each stair having a horizontal base and a vertical rise, comprising:

supporting said platform on each of said upper legs and the lower legs in a first position with said leg assemblies horizontal at a position ready for ascent in front of said first stair; and further comprising a repeat sequence of pivoting maneuvers including:

pivoting a first lower leg and a first upper leg such that said lower leg is substantially horizontal, with said distal end of said first lower leg in contact with said horizontal base of said second stair;

pivoting a second lower leg and second upper leg to lift said payload base hip section so that said payload base hip section makes contact with said first lower step horizontal base section;

pivoting said first lower leg and said first upper leg such that said lower leg is substantially horizontal, with said distal end of said first lower leg in contact with said horizontal base of a third higher stair;

pivoting said left lower leg and said left upper leg so that said payload base hip section makes contact with said second lower step horizontal base section;

and pivoting said second lower leg section and said second upper leg section so that said second lower leg section makes contact with the horizontal portion of said first stair said method for maintaining the vertical projection of the center of gravity within the projected stability area for each of the said pivoting maneuvers.

* * * * *